(12) United States Patent
Cartner

(10) Patent No.: US 7,363,754 B2
(45) Date of Patent: Apr. 29, 2008

(54) MOWING MACHINE

(76) Inventor: Jack O. Cartner, 1005 N. 8th St., Cambridge, OH (US) 43725

( * ) Notice: Subject to any disclaimer, the term of this patent is extended or adjusted under 35 U.S.C. 154(b) by 305 days.

(21) Appl. No.: 11/060,147

(22) Filed: Feb. 17, 2005

(65) Prior Publication Data

US 2006/0026940 A1 Feb. 9, 2006

Related U.S. Application Data

(63) Continuation-in-part of application No. 10/914,516, filed on Aug. 9, 2004.

(51) Int. Cl.
*A01D 75/18* (2006.01)
(52) U.S. Cl. .................. 56/10.4; 56/11.9; 60/469; 91/172
(58) Field of Classification Search ............... 56/10.4, 56/10.2 R, 12.5, 13.5, 13.6, 11.9, 12.7, 14.7, 56/14.9, 15.1, 15.2, 15.3, DIG. 3, DIG. 11, 56/DIG. 15; 144/4.1, 34.1; 91/172; 60/469, 60/414
See application file for complete search history.

(56) References Cited

U.S. PATENT DOCUMENTS

| | | | | |
|---|---|---|---|---|
| 3,045,413 | A | * | 7/1962 | Sheffer .................. 56/11.9 |
| 3,115,739 | A | * | 12/1963 | Thoen et al. .............. 56/6 |
| 3,177,638 | A | | 4/1965 | Johnson |
| 3,183,951 | A | * | 5/1965 | Larson .................. 144/4.1 |
| 3,183,952 | A | * | 5/1965 | Larson .................. 144/3.1 |
| 3,261,150 | A | * | 7/1966 | Fitzgerald, Sr. ........... 56/13.7 |
| 3,397,521 | A | * | 8/1968 | Danuser ................. 56/11.9 |
| 3,665,685 | A | * | 5/1972 | Allard ................... 56/10.4 |
| 3,715,872 | A | * | 2/1973 | Thompson, Jr. ........... 56/10.4 |
| 4,326,570 | A | * | 4/1982 | Fridley et al. ............ 144/336 |
| 4,854,112 | A | | 8/1989 | Holley et al. |
| 4,858,417 | A | | 8/1989 | Priefert et al. |
| 4,901,508 | A | | 2/1990 | Whatley |
| 5,146,733 | A | * | 9/1992 | Klaeger ..................... 56/6 |
| 5,220,773 | A | | 6/1993 | Klaeger |
| 6,085,505 | A | | 7/2000 | Edwards |
| 6,523,337 | B2 | * | 2/2003 | Spagnolo ................. 56/234 |
| 6,622,466 | B1 | | 9/2003 | Ethier |
| 6,675,564 | B1 | | 1/2004 | Ward |
| 6,804,957 | B2 | * | 10/2004 | Bruun .................... 60/414 |
| 6,860,093 | B2 | * | 3/2005 | Scordilis ................ 56/15.2 |

OTHER PUBLICATIONS

Portion of product brochure Alamo Under-The-Guardrail Side Mount Rotary Mower, prior to Aug. 2004.

(Continued)

*Primary Examiner*—Thomas B Will
*Assistant Examiner*—Jamie L McGowan
(74) *Attorney, Agent, or Firm*—Fay Sharpe LLP

(57) ABSTRACT

A control system for a trimmer head assembly includes a first arm including a first mowing device, a first cylinder connected to the first arm, a source of fluid in selective communication with the first cylinder via a fluid line, and an accumulator in selective communication with the first cylinder when the first cylinder is not in communication with the source of fluid. The accumulator is adapted to receive fluid from the first cylinder when an external force is applied to the first arm and to deliver fluid to the first cylinder when the external force has been removed from the first arm.

18 Claims, 17 Drawing Sheets

OTHER PUBLICATIONS

Portion of product brochure Tiger Guard Rail Mowers, prior to Aug. 2004.

Tiger Corporation, Rotary and Flail Mowers for Highw . . . at http://www.tiger-mowers.com/products/mowers/r_rotary.asp, printed on Apr. 19, 2004.

* cited by examiner

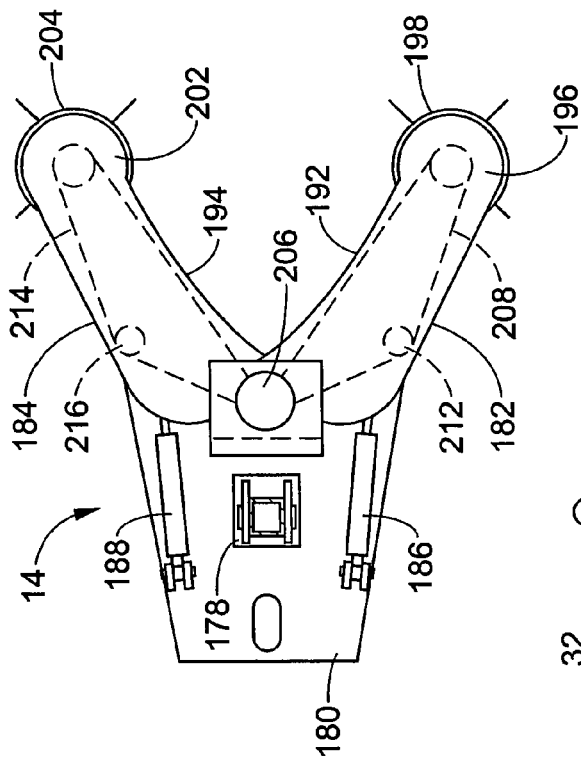
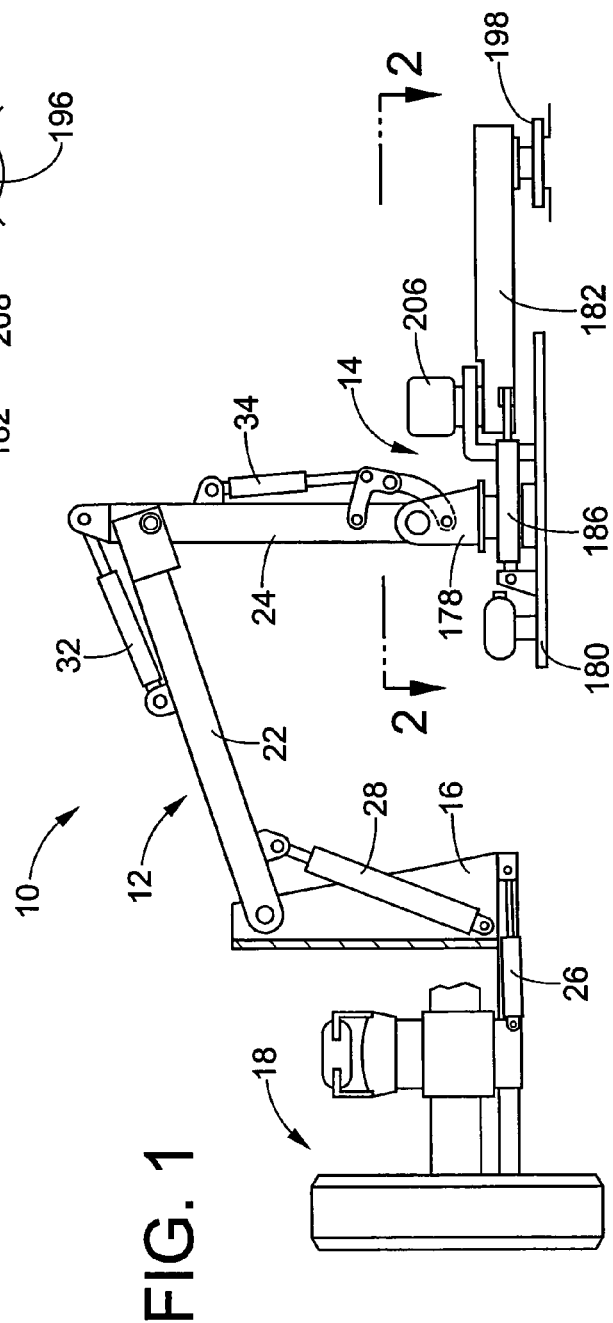
FIG. 1
FIG. 2

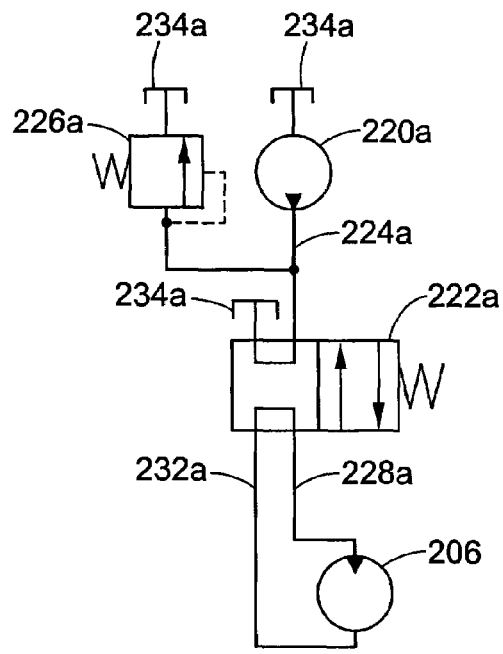
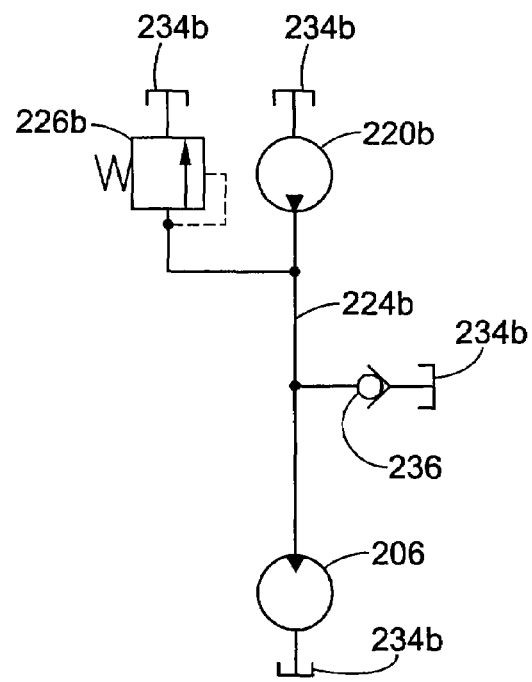
FIG. 5A  FIG. 5B
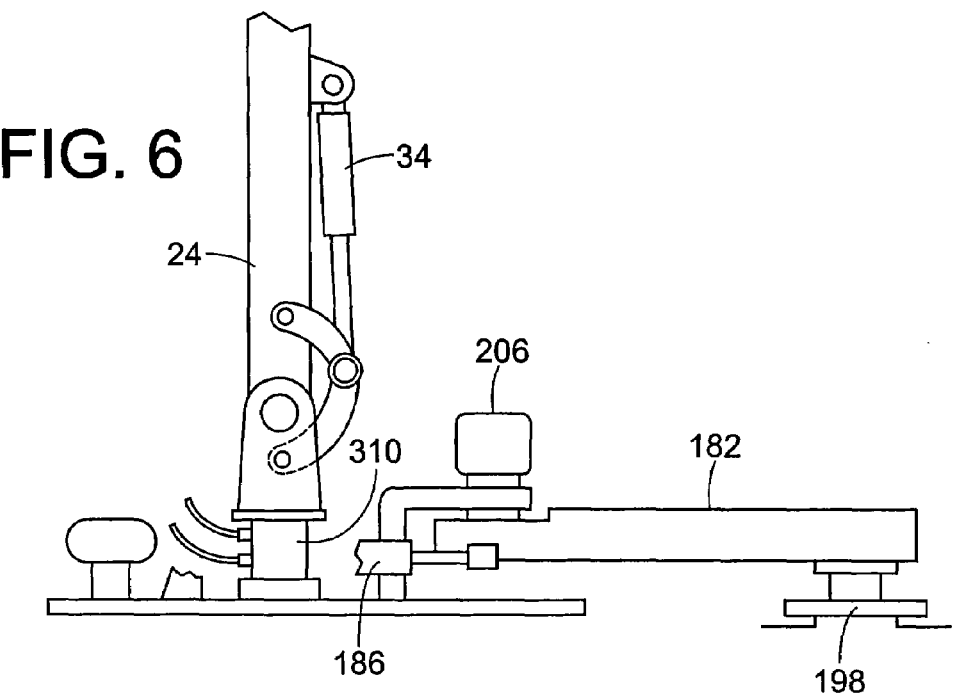
FIG. 6

MOWING MACHINE

This application is a continuation-in-part of application Ser. No. 10/914,516 filed Aug. 9, 2004, which is incorporated by reference herein in its entirety.

BACKGROUND OF THE INVENTION

The present invention pertains to mowing machines. More particularly, it pertains to mowing machines employing a pair of movable cutter arms mounted on a support.

Mowing vegetation alongside roadways by use of a tractor or other vehicle propelling a mowing implement is well known. Many roadways have barriers adjacent the side of the roadways. These barriers can include guardrails, fences, and the like horizontal members which are usually supported by a plurality of spaced vertical posts or other support members. Vegetation grows around the vertical support members and underneath the horizontal members. To mow underneath the horizontal members requires a mowing implement which can fit beneath them. To mow around the vertical support members requires the mowing implement to move close to the vertical support members.

Known attempts at mowing under and around fences and/or guardrails include a mowing implement mounted to an extension, which is attached to a prime mover or tractor. As the tractor moves down the roadway, the mowing implement is moved underneath the horizontal member until the mowing implement contacts a post. There upon the mowing implement is moved out of the way. After passing the post, the mowing implement is again moved back underneath the horizontal member. However, this design leaves uncut vegetation around the post.

In fact, none of the known mowing implements have successfully cut vegetation, around the periphery of guardrail posts and the like, in excess of 180°, as the prime mover to which they are mounted continues to travel down the adjacent roadway.

SUMMARY OF THE INVENTION

A control system for a trimmer head assembly includes a first arm including a first mowing device, a first cylinder connected to the first arm, a source of fluid in selective communication with the first cylinder via a fluid line, and an accumulator in selective communication with the first cylinder when the first cylinder is not in communication with the source of fluid. The accumulator is adapted to receive fluid from the first cylinder when an external force is applied to the first arm and to deliver fluid to the first cylinder when the external force has been removed from the first arm.

A control system for a trimmer assembly mounted on an associated mowing machine includes a first arm including a first mowing device, a first cylinder connected to the first arm, a second arm including a second mowing device, a second cylinder connected to the second arm, a source of fluid in communication with the first cylinder and the second cylinder via at least one fluid line, a first control valve located in the at least one fluid line, a second control valve located in the at least one fluid line, and a first accumulator in selective communication with at least one of the first cylinder and the second cylinder. An associated first actuator operates the first control valve between an operating position and a neutral position. The first control valve allows fluid to flow between the source of fluid and the first cylinder when the first control valve is in the operating position. An associated second actuator operates the second control valve between an operating position and a neutral position. The second control valve allows fluid to flow between the source of fluid and the second cylinder when the second control valve is in the operating position.

A system for controlling a pair of arms of a trimmer head of a mowing apparatus includes a first arm including a first cutter, a first cylinder connected to the first arm, a second arm including a second cutter, a second cylinder connected to the second arm, and an accumulator in selective fluid communication with at least one of the first and second cylinders. The first cylinder is in selective fluid communication with the second cylinder. The accumulator is adapted to receive fluid from at least one of the first and second cylinders when an external force is applied to the arm connected to the at least one of the first and second cylinders.

A method for mowing around an obstacle such as a guard rail post includes positioning a trimmer head in a mowing position in relation to an obstacle. The trimmer head includes a first arm having a cutter mounted thereto and a second arm having a cutter mounted thereto. The method further includes moving the trimmer head in a first direction toward the obstacle, contacting the obstacle with the first arm, automatically moving the first arm from a first arm position in response to a force exerted on the first arm body obstacle, and automatically moving the second arm in response to the force exerted on the first arm body obstacle.

BRIEF DESCRIPTION OF THE FIGURES

FIG. 1 is a side schematic view of a mowing machine according to a first embodiment of the present invention, mounted to a prime mover, wherein only a portion of the prime mover is shown.

FIG. 2 is a schematic top plan view of a trimmer head of the mowing machine of FIG. 1.

FIGS. 5A and 5B are circuit diagrams of two embodiments of hydraulic control circuits for control of a motor that powers mowing elements on the trimmer head of the mowing machine of FIG. 1.

FIG. 6 is an enlarged side elevational view of the trimmer head and a portion of the boom assembly of the mowing machine of FIG. 1 with portions of the trimmer head broken away.

DETAILED DESCRIPTION OF THE PREFERRED EMBODIMENTS

Figure 3:
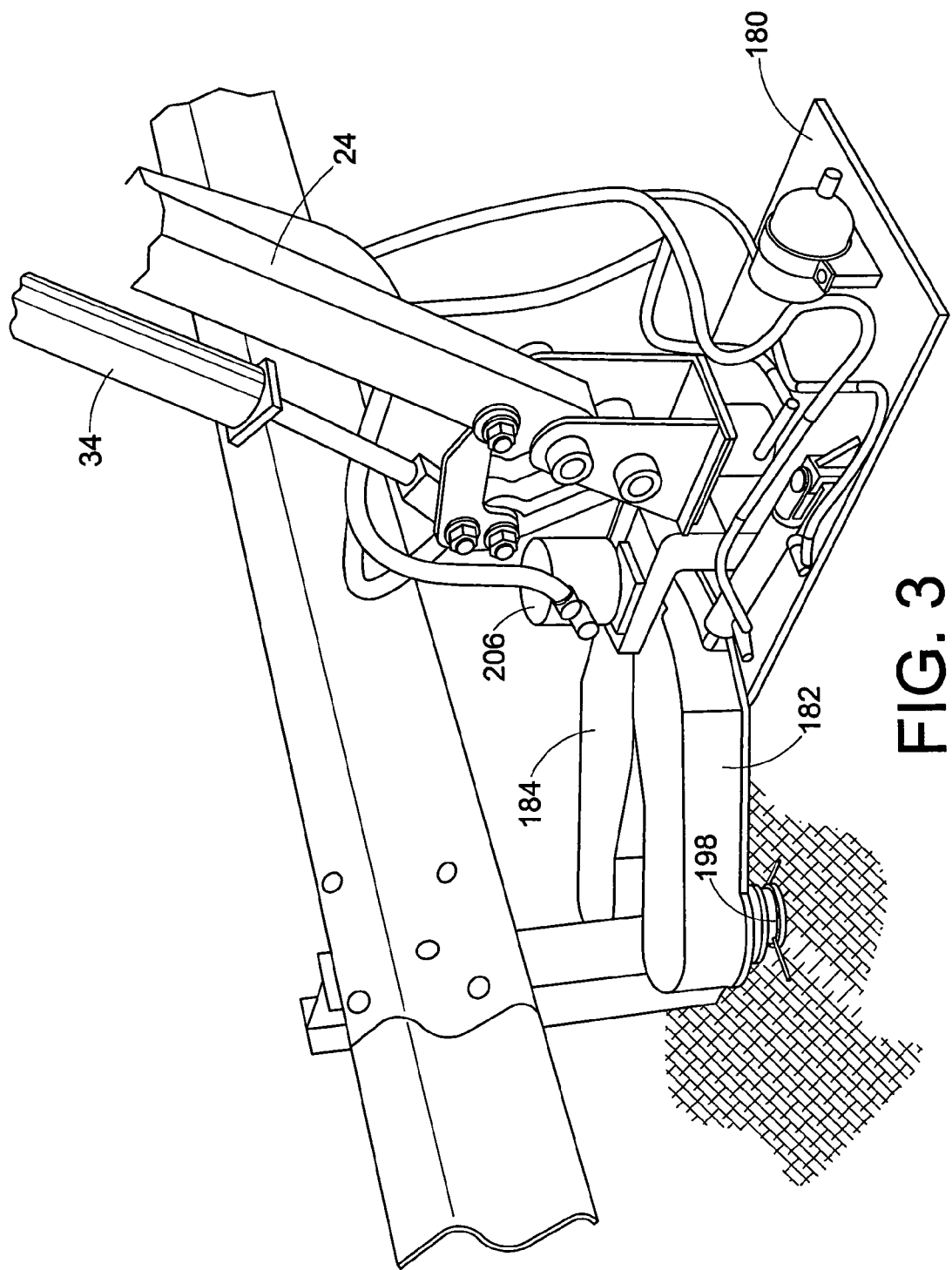
FIG. 3 is an enlarged perspective view of the trimmer head and a portion of a boom assembly of the mowing machine of FIG. 1 adjacent a vertical support member for a guardrail.

Referring now to the drawings, wherein the showings are for the purpose of illustrating preferred embodiments of the invention only, and not for the purposes of limiting the invention, FIG. 1 illustrates a mowing machine 10 which includes a boom assembly 12 and a trimmer head 14 attached to the boom assembly. The boom assembly 12 is similar to a conventional boom used on a backhoe or the like in that the boom assembly includes arms or sections which are hingedly fastened to one another. The boom 12 includes a first arm 16 located adjacent a vehicle 18 (only a portion of which is shown in FIG. 1). The vehicle can be a wheeled tractor or the like.

The first arm connects to a second or central arm 22 which connects to a third or outer arm 24. The first arm can pivot in a first plane, which is typically horizontal and parallel to the ground surface, i.e., the roadway and ground to be mowed, by use of a first piston and cylinder assembly, which for sake of brevity will hereafter be simply termed cylinder 26. An additional cylinder (not shown) can be provided, if desired, on an opposite side of the first arm 16 from the first cylinder 26 to also control movement of the first arm. It should be appreciated that, the first arm pivots around a generally vertical axis. A second cylinder 28, which is attached to the first arm 16 and the second arm 22, controls the pivotal movement of the second arm 22 in relation to the first arm 16. The second arm 22 pivots around a generally horizontal axis. A third cylinder 32, which attaches to the second arm 22 and the third arm 24, controls the pivotal movement of the third arm 24 with respect to the second arm 22. The third arm also pivots around a generally horizontal axis.

The trimmer head 14 attaches to the third arm 24 opposite the point of attachment between the third arm and the second arm 22. A fourth cylinder 34 controls the pivotal movement of the trimmer head 14 with respect to the third arm 24. As with the third arm, the trimmer head pivots around a horizontal axis. However, it is also capable of pivoting around a vertical axis, as will be discussed below. While a main support arm with several sections is shown, it should be appreciated that more or less sections could be used. Thus, the trimmer head or cutter head 14 could be attached to a single section arm, if so desired.

The cylinders 26, 28, 32, and 34 for the boom assembly 12 can be known hydraulic cylinders that receive hydraulic fluid from hoses (not shown in FIG. 1, some hoses are shown in FIG. 3). The boom assembly 12 can include a breakaway system that allows the boom assembly to swing away from an obstruction in response to a force exerted on the boom assembly that overcomes the hydraulic force of the first cylinder 26 and/or its counterpart (not shown) on the opposite side of the first arm 16. The breakaway system allows the boom arm assembly 12 to minimize any harm to the hydraulic system, the boom arms or the trimmer head.

Figure 4A:
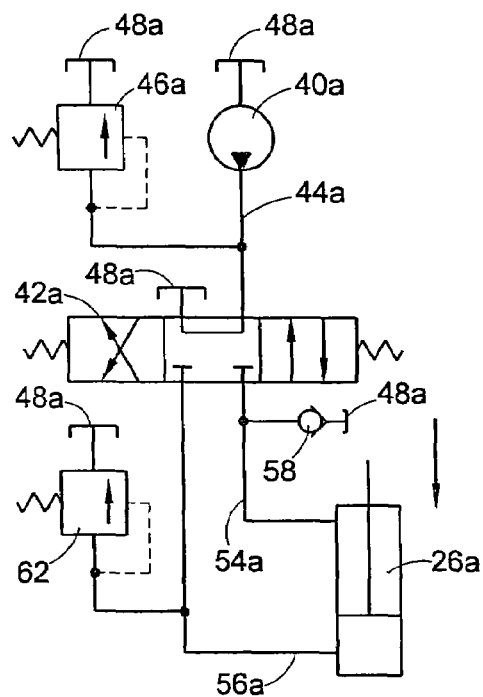
FIGS. 4A-4O are circuit diagrams of a number of embodiments of hydraulic control circuits for control of the boom assembly of the mower machine of FIG. 1.
Figure 4C:
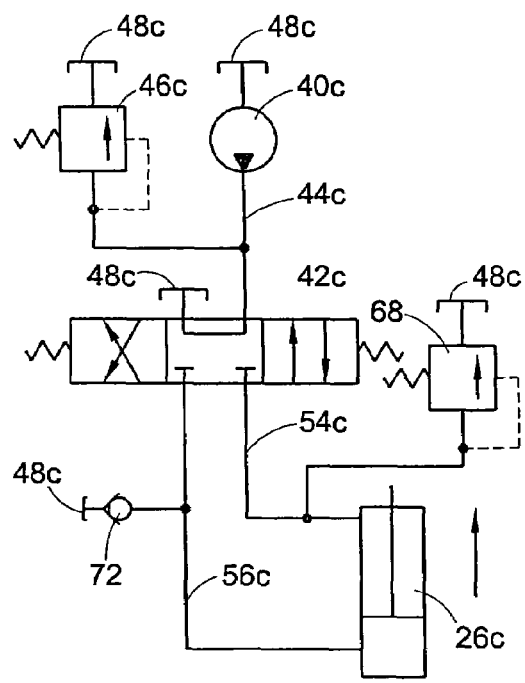
Figure 4B:
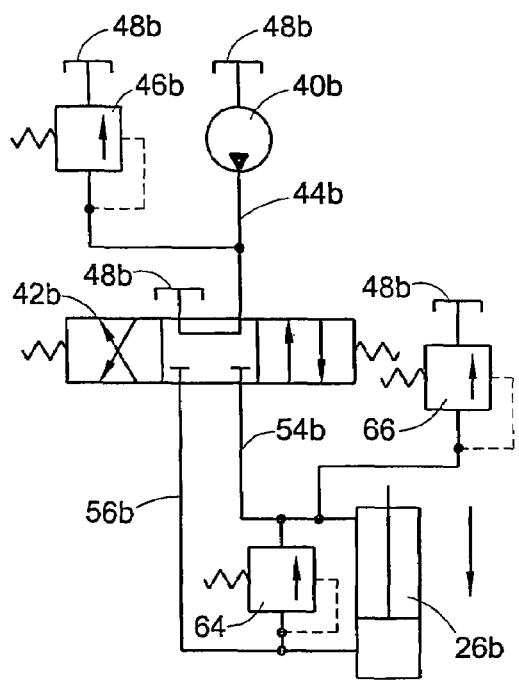
Figure 4D:
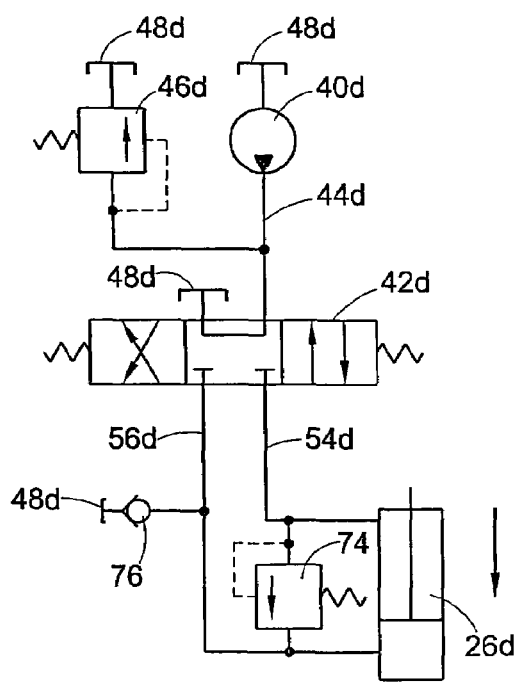
Figure 4F:
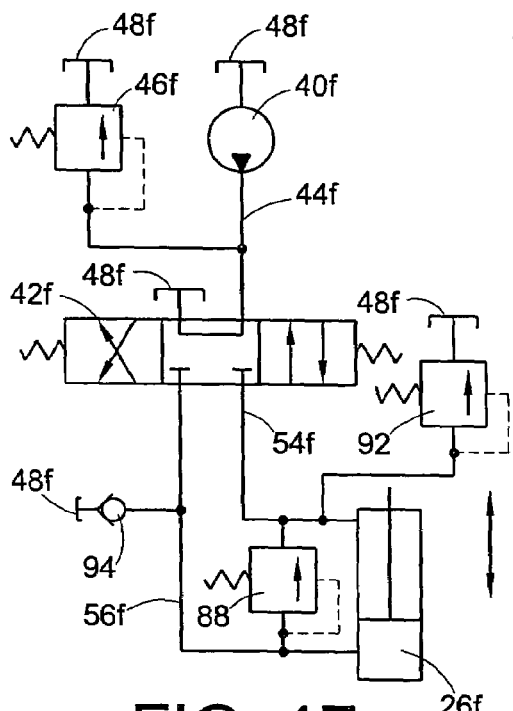
Figure 4G:
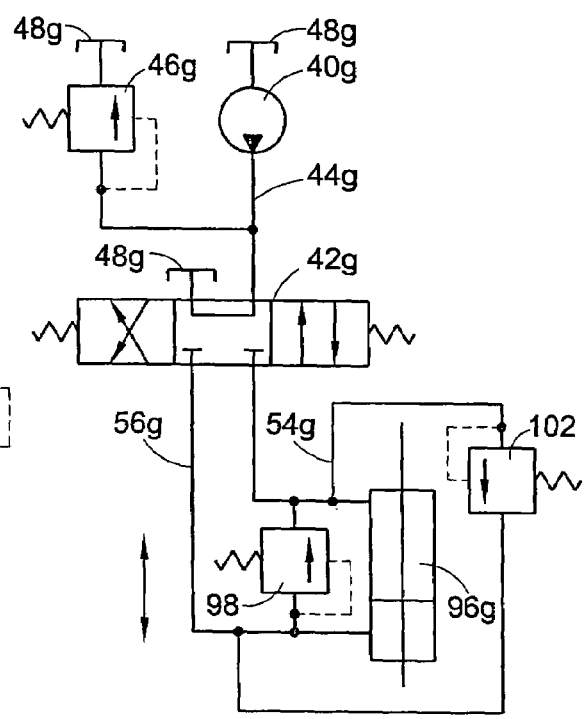
Figure 4E:
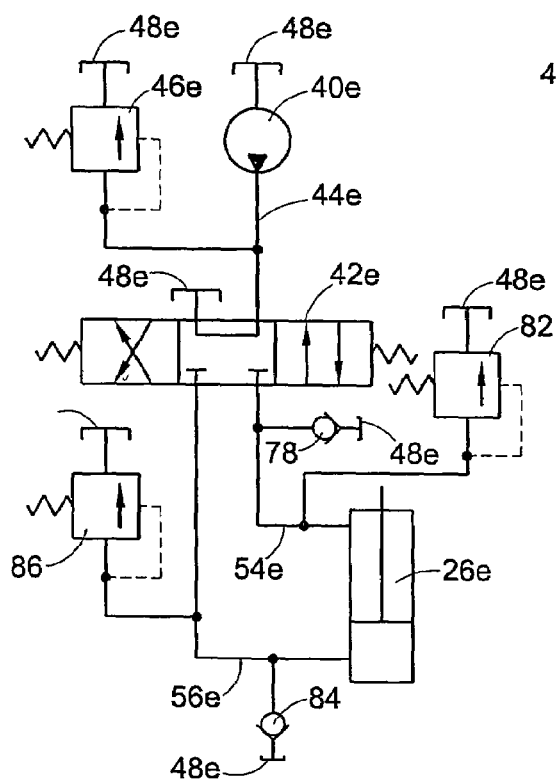
Figure 4H:
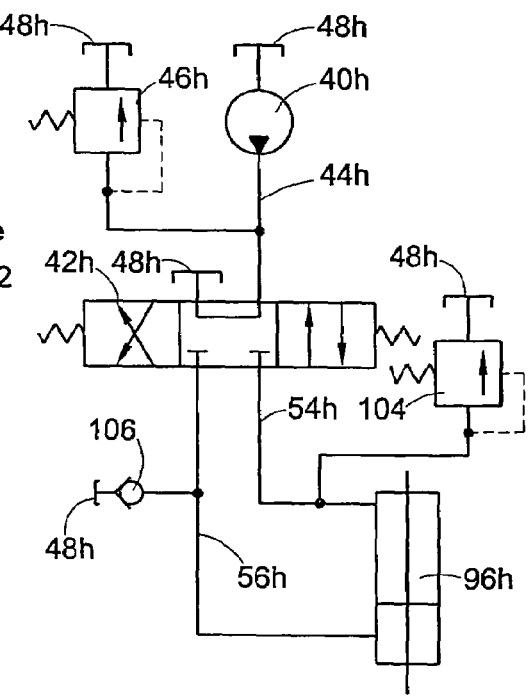
Figure 4I:
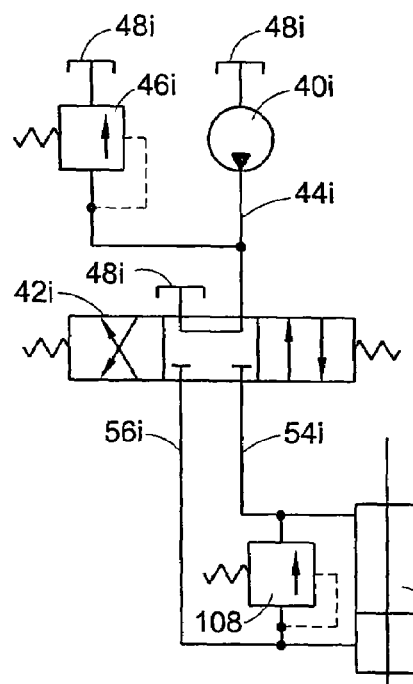
Figure 4J:
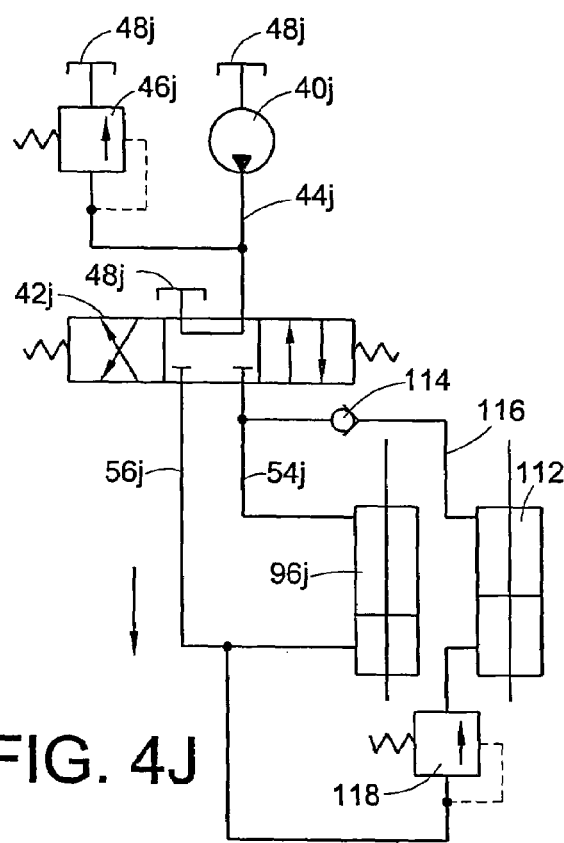
Figure 4K:
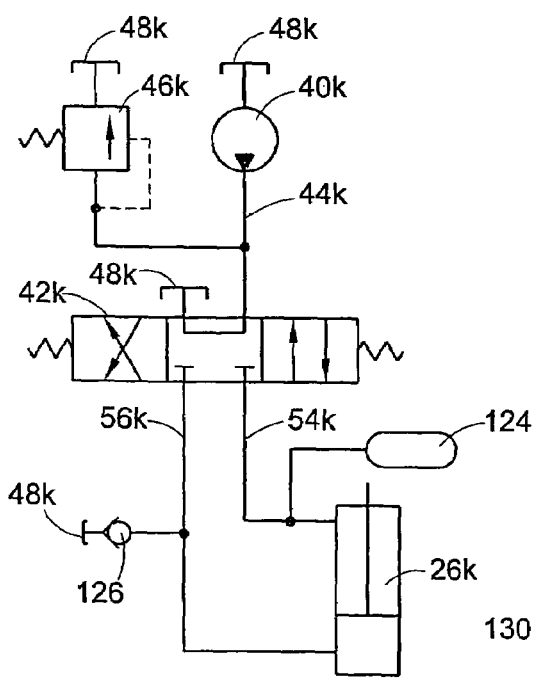
Figure 4L:
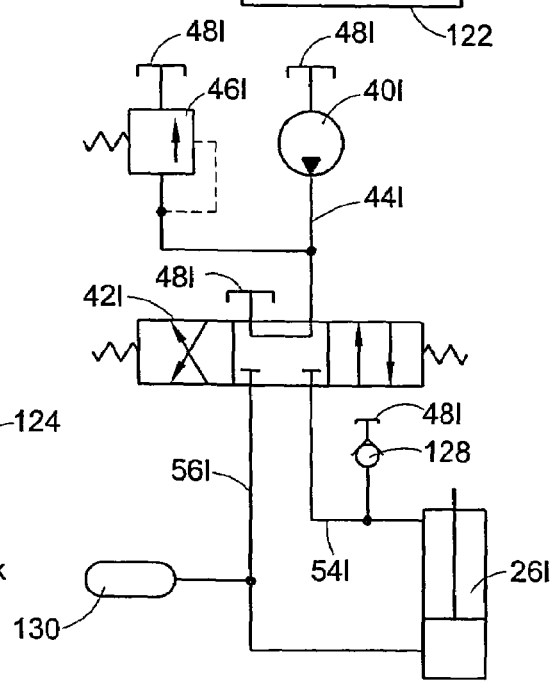
Figure 4M:
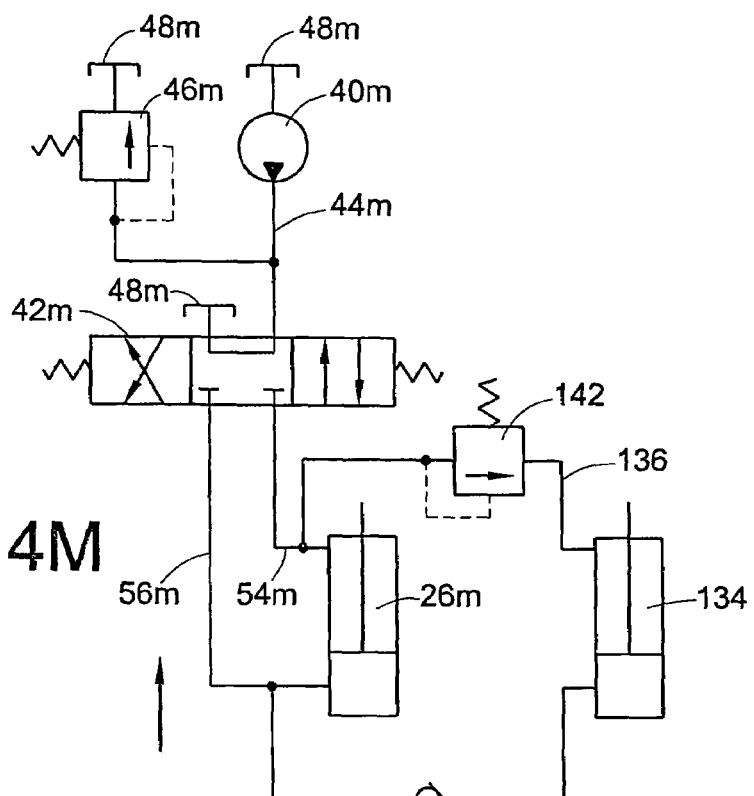
Figure 4N:
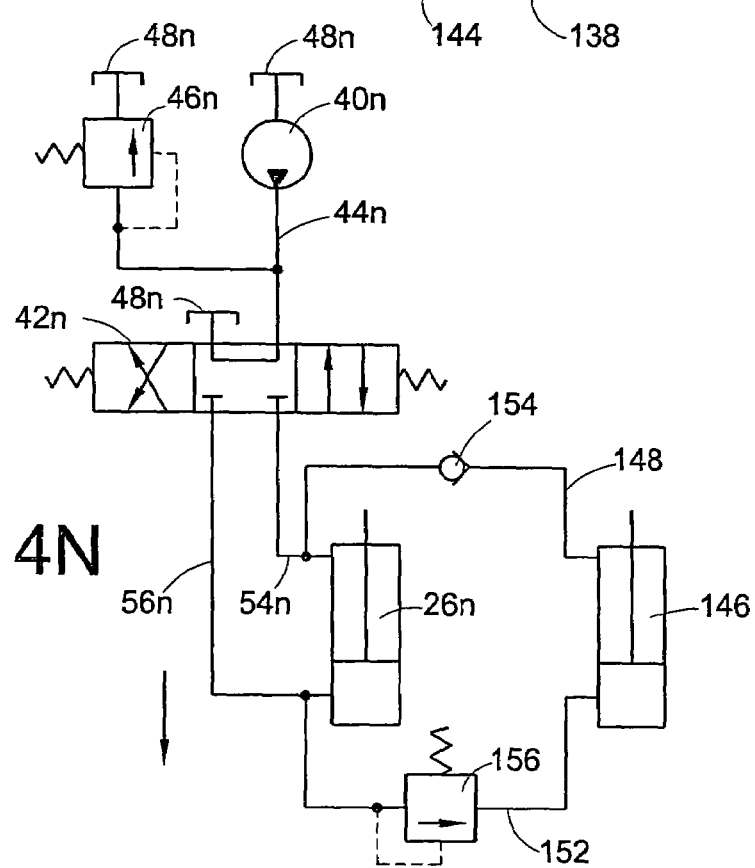
Figure 4O:
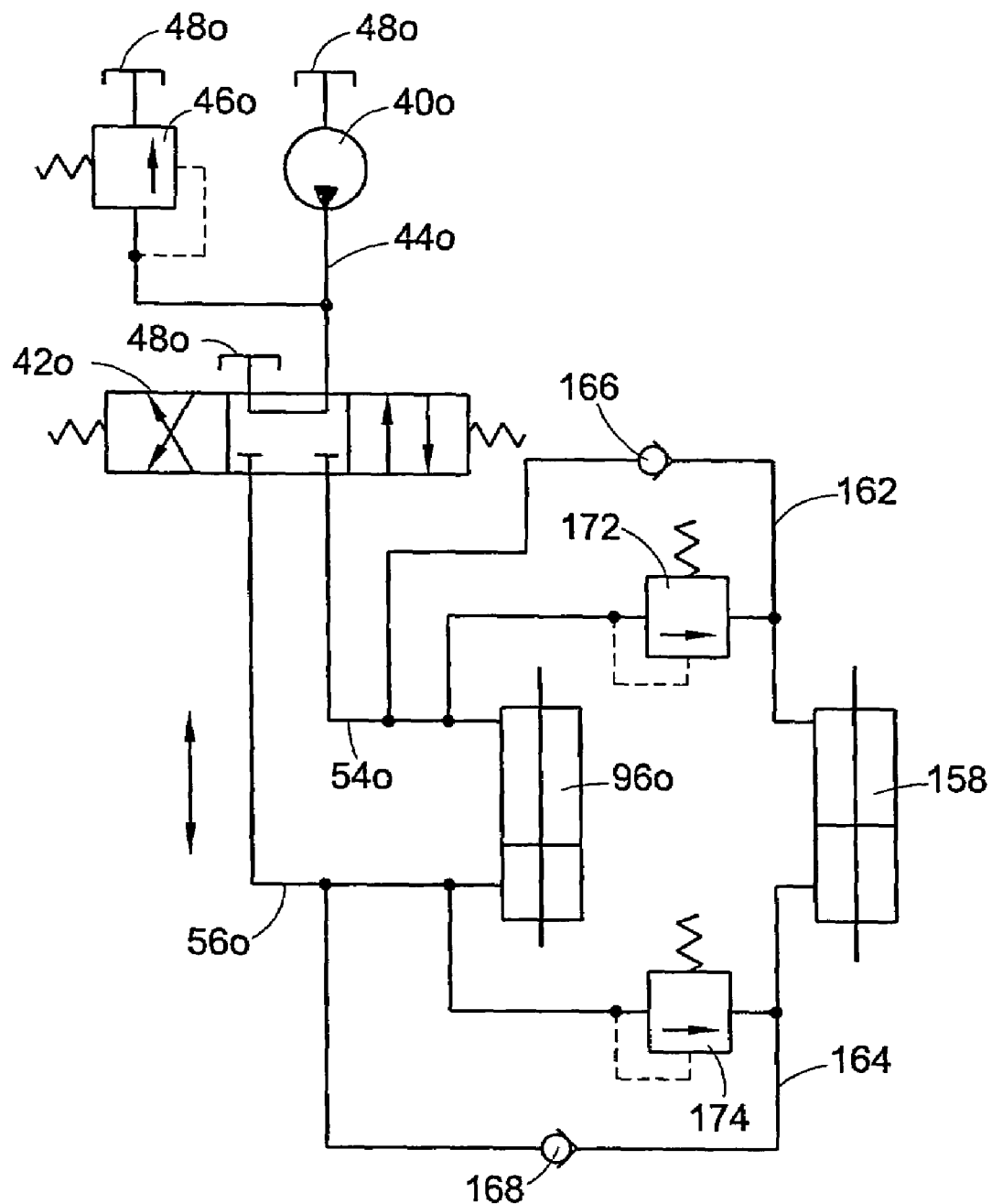

FIGS. 4A-4O disclose alternative circuit diagrams that can be used to control the swing of the boom assembly 12 and the breakaway system for the boom assembly. For the circuit diagrams depicted in FIGS. 4A-4O like numerals will refer to like components and each numeral will contain a suffix corresponding to the appropriate figures, for example FIG. 4A includes the suffix "a", FIG. 4B includes the suffix "b", etc.

With reference to FIG. 4A, a pump 40a communicates with a three-position/four-connection (4/3) valve 42a via a supply line 44a. A relief valve 46a is connected between the pump 40a and the 4/3 valve 42a along the supply line 44a. The pump 40a, the 4/3 valve 42a, and the relief valve 46a also communicate with a reservoir 48a. This pump and valve arrangement is similar throughout the remainder of the circuit diagrams disclosed in FIGS. 4A-4O; therefore, for the sake of brevity this upper portion in the remainder of the diagrams will not be described.

The 4/3 valve 42a communicates with a double-acting differential cylinder 26a (which is depicted as 26 in FIG. 1) via a supply line 54a and an exhaust line 56a. A check valve 58 is interposed between the 4/3 valve 42a and the cylinder 26a on the supply line 54a. The check valve 58 communicates with the reservoir 48a. A relief valve 62 is interposed between the cylinder 26a and the 4/3 valve 42a along the exhaust line 56a. The relief valve 62 also communicates with the reservoir 48a.

An alternative circuit diagram is shown in FIG. 4B. In this alternative, a first relief valve 64 is connected in parallel with the cylinder 26b and is connected to both the supply line 54b and the exhaust line 56b. A second relief valve 66 is connected to the supply line 54b between the 4/3 valve 42b and the cylinder 26b. The second relief valve 66 communicates with the reservoir 48b.

With reference to FIG. 4C another alternative circuit is shown. In this alternative, a relief valve 68 is connected to the supply line 54c and is located between the 4/3 valve 42c and the cylinder 26c. A check valve 72 is located on the exhaust line 56c between the cylinder 26c and the 4/3 valve 42c. Both the relief valve 68 and the check valve 72 communicate with the reservoir 48c.

With reference to FIG. 4D, a relief valve 74 is connected in parallel with the cylinder 26d and interconnects the feed line 54d and the exhaust line 56d. A check valve 76 is provided on the exhaust line 56d interposed between the cylinder 26d and the 4/3 valve 42d. The check valve 76 communicates with the reservoir 48d.

With reference to FIG. 4E, another embodiment of a circuit for control of the boom assembly 12 (FIG. 1) is shown. In this embodiment, a first check valve 78 communicates with the supply line 54e between the 4/3 valve 42e and the cylinder 26e. A first relief valve 82 is interposed between the first check valve 78 and the cylinder 26e on the supply line 54e. A second check valve 84 is placed on the exhaust line 56e between the cylinder 26e and the 4/3 valve 42e. A second relief valve 86 communicates with the exhaust line 56e between the check valve 84 and the 4/3 valve 42e. Each of the valves 78, 82, 84 and 86 communicate with the reservoir 48e.

With reference to FIG. 4F, another circuit configuration is shown. A first relief valve 88 is connected in parallel with the cylinder 26f and connects the supply line 54f to the exhaust line 56f. A second relief valve 92 is connected to the supply line 54f between the first relief valve 88 and the cylinder 26f. A check valve 94 is positioned between the first relief valve 88 and the 4/3 valve 42f on the exhaust line 56f. The second relief valve 92 and the check valve 94 communicate with the reservoir 48f.

With reference to FIG. 4G, the 4/3 valve 42g communicates with a double-acting non-differential cylinder 96g (a double-acting non-differential cylinder is also provided in the circuit diagrams depicted in FIG. 4H-4I and 4J and therefore will also include a suffix) via first line 54g and second line 56g. In other words, instead of employing a double acting differential cylinder 26, a double acting non-differential cylinder can be used as the means for rotating the first boom arm 16. A first relief valve 98 is connected in parallel with the cylinder 96g connecting the first line 54g to the second line 56g. A second relief valve 102 is also connected in parallel with the cylinder 96g. The second relief valve 102 connects between the first relief valve 98 and the cylinder 96g, at its intake and between the first relief valve 98 and the 4/3 valve 42g at its exhaust. In this way, a breakaway feature is provided for the cylinder 96g, no matter which way it moves.

With reference to FIG. 4H, an alternative circuit configuration is shown. In this embodiment, a relief valve 104 is connected to the first line 54h between the 4/3 valve 42h and the cylinder 96h. A check valve 106 is connected to the second line 56h between the cylinder 96h and the 4/3 valve 42h. Each valve 104 and 106 communicates with the reservoir 48h.

With reference to FIG. 4I, another embodiment of a hydraulic circuit is shown. In this embodiment, a relief valve 108 is connected in parallel with cylinder 96i.

With reference to FIG. 4J, another embodiment of a hydraulic circuit is shown. In this embodiment, a second double-acting non-differential cylinder 112 is provided in addition to the first double-acting non-differential cylinder 96j. A check valve 114 is disposed on a supply line 116 leading to the second cylinder 112. A relief valve 118 is disposed in an exhaust line 122 of the second cylinder 112. The second cylinder 112 is connected in parallel with the first cylinder 96j.

With reference to FIG. 4K, an alternative hydraulic circuit configuration is shown. In this embodiment, the 4/3 valve 42k communicates with the double-acting differential cylinder 26k via the supply line 54k and the exhaust line 56k. An accumulator 124 connects to the supply line 54k between the 4/3 valve 42k and the cylinder 26k. A check valve 126 communicates with the exhaust line 56k between the 4/3 valve 42k and the piston 26k. The check valve 126 communicates with the reservoir 48k.

With reference to FIG. 4L, an alternative hydraulic circuit configuration is disclosed. In this embodiment, a check valve 128 communicates with the supply line 54l between the 4/3 valve 42l and the cylinder 26l. The check valve communicates with the reservoir 48l. An accumulator 130 communicates with the exhaust line between the cylinder 26l and the 4/3 valve 42l.

With reference to FIG. 4M, a second double-acting differential cylinder 134 is provided in addition to and connected in parallel with the first cylinder 26m. The second cylinder 134 is fed via a supply line 136, which connects to supply line 54m, and exhausts through an exhaust line 138, which connects to exhaust line 56m. A relief valve 142 is connected to the supply line 136 of the second cylinder 134. A check valve 144 is positioned in the exhaust line 138 of the second cylinder 134.

With reference to FIG. 4N, a second double-acting differential cylinder 146 is provided in this embodiment, in addition to and connected in parallel with the first cylinder 26n. The second cylinder 146 is supplied via a supply line 148, which connects to supply line 54n, and exhausts through an exhaust line 152, which connects to exhaust line 56n. A check valve 154 is provided in the supply line 148 of the second cylinder 146. A relief valve 156 is provided in the exhaust line 152 of the second cylinder 146. In contrast to FIG. 4M, the location of the check valve 154 and the relief valve 156 are reversed in FIG. 4N.

With reference to FIG. 4O, another embodiment of a hydraulic configuration is disclosed. In this embodiment, a 4/3 valve 42o communicates with a first double-acting non-differential cylinder 96o via a supply line 54o and an exhaust line 56o. A second double-acting non-differential cylinder 158 is provided as well and is connected in parallel with the first cylinder 96o. A supply line 162 feeds the second differential cylinder 158 and an exhaust line 164 is provided for the second cylinder. Check valves 166 and 168 are located in the supply line 162 and the exhaust line 164, respectively. Relief valves 172 and 174 are connected to the supply lines 54o and 162 and relief lines 56o and 164, respectively.

The functions performed by the control valve assembly, relief valves and check valves in the circuit diagrams disclosed in FIGS. 4A-4O can be incorporated into a single control valve package in each of the respective hydraulic circuits. As is apparent, the control valves described above are used to position the boom assembly. The control valves can be actuated by any known actuator in addition to or in lieu of the spring actuator that is depicted. In addition to a hydraulic breakaway system, the breakaway system can also be spring actuated. Other known breakaway systems are also contemplated.

With reference back to FIG. 2, the trimmer head 14 includes a stem 178 pivotally attached to the third arm 24 (FIG. 1) of the boom arm assembly 12 and a support plate 180 rotatably mounted to the stem. A first arm 182 and a second arm 184 pivotally mount to the support plate. The arms 182 and 184 can pivot about a common axis, or the arms can pivot about two axes that are spaced from one another and generally aligned with each other. Positioning of the first arm 182 is controlled by a first cylinder 186. Likewise, positioning of the second arm 184 is controlled by a second cylinder 188. The cylinders 186 and 188 attach to the support plate 180 and the respective arm 182 or 184. Each arm 182 and 184 includes a curved inner surface 192 and 194, respectively. The curved inner surfaces 192 and 194 facilitate positioning of the arms 182 and 184 around a vertical support member such as a guardrail post or fence post, which can be appreciated when discussing FIG. 12 below. The first arm 182 includes a distal end 196 to which a cutting element 198 is rotably mounted. Similarly, the second arm 184 includes a distal end 202 to which a cutting element 204 is rotably mounted. The distal ends 196 and 202 of the arms can have a larger width than the portion of each arm adjacent the end.

The cutting or mowing elements 198 and 204 can comprise a blade similar to a conventional lawn mower blade or a string similar to a conventional string-type cutter or trimmer. The mowing elements 198 and 204 can also comprise other known devices that can cut vegetation.

A motor 206 is provided to drive the mowing elements 198 and 204. In one embodiment the motor 206 can comprise a hydraulic motor; however other known drive mechanisms can be provided. The motor 206 drives the respective mowing elements 198 and 204 via a first drive belt 208 over a first pulley 212 and a second drive belt 214 over a second pulley 216. However, it should be appreciated that the motor 206 can operatively engage the mowing elements via other known mechanisms. For example, the cutter heads could be chain driven. Also a separate motor could be used for each cutter head.

As mentioned above the motor 206 can be a hydraulic motor. With reference to FIGS. 5A and 5B two hydraulic circuit diagrams for the motor 206 are shown. Similar to the description of FIGS. 4A-4O, for FIGS. 5A and 5B, reference numerals with a suffix will be used where like numerals refer to like elements. In FIG. 5A, a pump 220a communicates with a two-position four-connection (4/2) valve 222a via a supply line 224a. A relief valve 226a communicates with the supply line 224a between the 4/2 valve 222a and the pump 220a. The 4/2 valve 222a communicates with the motor 206 via a supply line 228a and an exhaust line 232a. The pump 220a, the relief valve 226a and the 4/2 valve 222a all communicate with a reservoir 234a. It should be appreciated that reservoir 234a can be the same reservoir as reservoir 48a-o discussed in connection with FIGS. 4A-4O.

With reference to FIG. 5B, an alternative hydraulic circuitry is shown. In this embodiment, the pump 220b communicates directly with the motor 206 and a check valve 236 is provided between the pump 220b and the motor 206.

Figure 8:
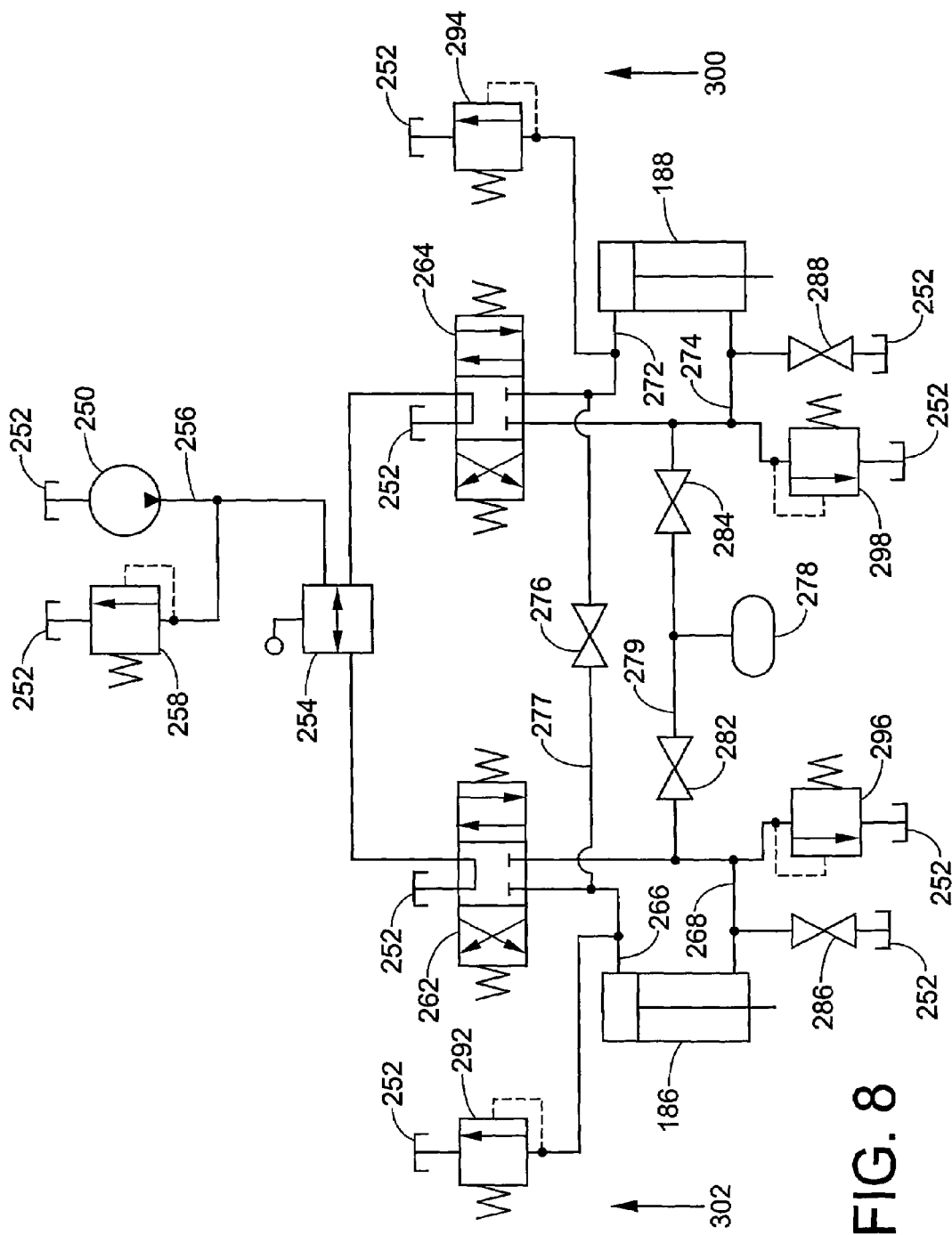
FIG. 8 is a circuit diagram of a hydraulic control circuit for control of the arms of the trimmer head of the mowing machine of FIG. 1.

As mentioned above, the arms 182 and 184 (FIG. 2) can pivot on the support plate 180. The arms can automatically rotate due to the hydraulic circuitry provided to control the arms. With reference to FIG. 8, an embodiment of the hydraulic circuitry that controls the arms 82 and 84 is disclosed. In this embodiment, a pump 250 pumps fluid from a reservoir 252 towards a directional flow control valve 254 via a supply line 256. A relief valve 258 can communicate with the supply line 256 between the pump 250 and the directional flow control valve 254. The relief valve 258 communicates with the reservoir 252.

The directional flow control valve 254 communicates with a first 4/3 control valve 262 and a second 4/3 control valve 264. The 4/3 control valves 262 and 264 control the position of the hydraulic cylinders 186 and 188 (also shown in FIG. 2) on the support plate 180. The first 4/3 valve 262 communicates with the first hydraulic cylinder 186 via a supply line 266 and a exhaust line 268. Similarly, the second 4/3 valve 264 communicates with the second hydraulic cylinder 188 via a supply line 272 and an exhaust line 274. A first shutoff valve 276 is located in a first line 277 that interconnects the supply line 266 of the first hydraulic cylinder 186 and the supply line 272 of the second hydraulic cylinder 188. An accumulator 278 communicates with the exhaust line 268 of the first hydraulic cylinder 186 and the exhaust line 274 of the second hydraulic cylinder 188 via a second connecting line 279.

A second check valve 282 is positioned in the second connecting line 279 between the exhaust line 268 of the first hydraulic cylinder 186 and the accumulator 278. A third check valve 284 is positioned in the second connecting line 279 between the accumulator 278 and the exhaust line 274 of the second hydraulic cylinder 188. A fourth shutoff valve 286 is provided on the exhaust line 268 of the hydraulic cylinder 186 that communicates with the reservoir 252. A fifth shutoff valve 288 is provided on the exhaust line 274 of the second hydraulic cylinder 188 and communicates with the reservoir 252.

If desired, a first relief valve 292 can be provided to communicate with the supply line 266 of the first hydraulic cylinder 186. A second relief valve 294 can also be employed to communicate with the supply line 272 of the second hydraulic cylinder 188. A third relief valve 296 can be used to communicate with the exhaust line 268 of the first hydraulic cylinder 186. A fourth relief valve 298 can communicate with the exhaust line 274 of the second hydraulic cylinder 188. Each of the relief valves 292, 294, 296 and 298 communicates with the reservoir 252. It should be appreciated that the use of all of these relief valves is optional. The functions performed by the valves 262, 264, 276 and 258 may also be performed by a two spool valve or by a stacked two spool valve assembly, if desired.

Figure 10:
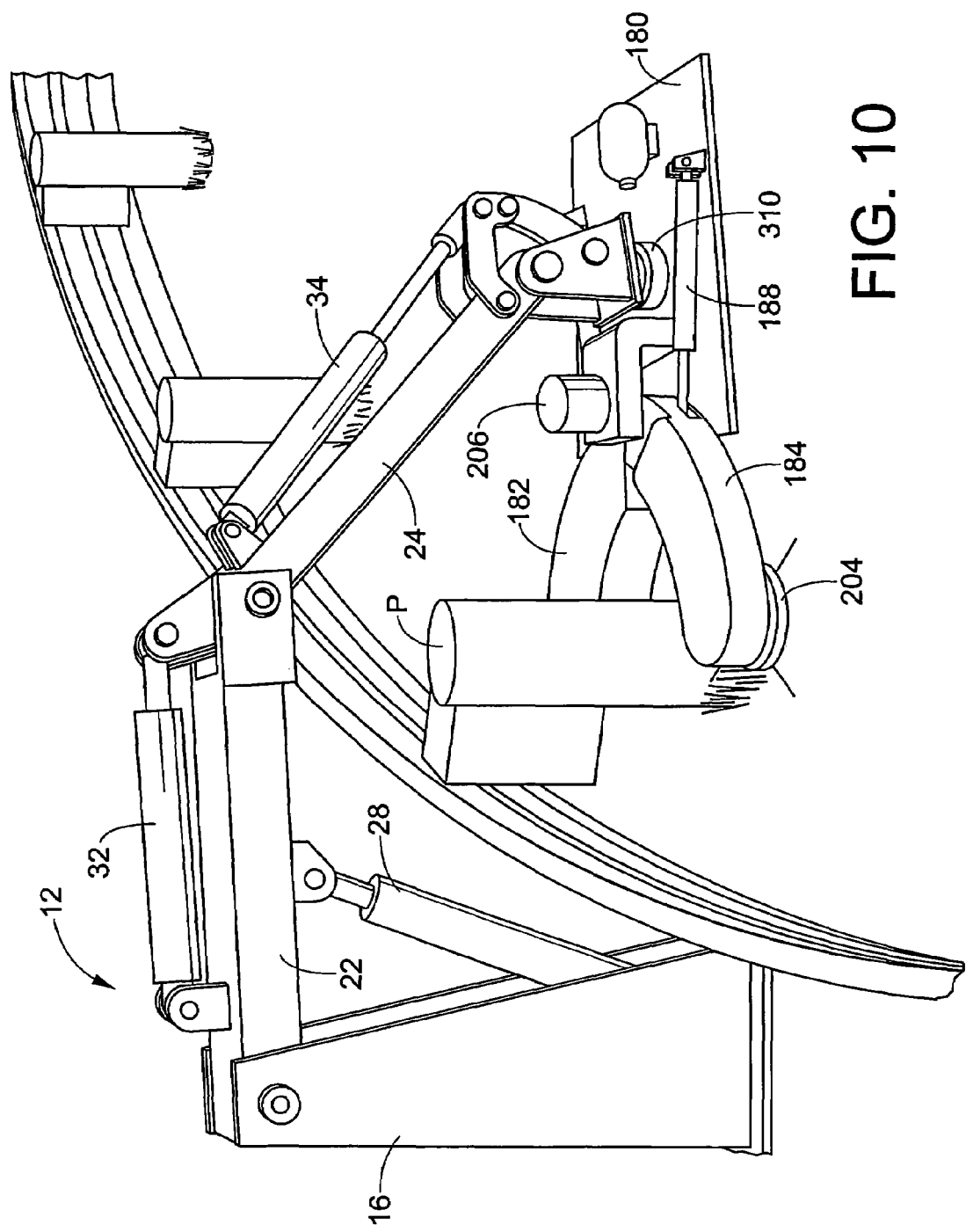
FIG. 10 depicts the mowing machine of FIG. 1 mowing a rear side of a barrier such as a guardrail.

As mentioned above, the arms 182 and 184 can automatically rotate and swing into a position to allow for cutting around a vertical support member, i.e., a post, for a guardrail, fence or other barrier. FIGS. 3 and 10 show a mowing machine according to the present invention cutting around opposite sides of a post P. FIG. 12 depicts the automatic movement of the arms of the apparatus around the post, when the mowing apparatus is positioned on the backside, i.e., the side of the guardrail opposite the roadway, and will be explained in more detail below.

Referring to FIG. 8, to allow for automatic movement of the arms 182 and 184 (FIG. 1) shut off valves 276, 282, 284, 286, and 288 are closed. The first and second hydraulic cylinders 186 and 188 are moved to position the arms 182 and 184 to desired locations by operating the directional control valve 254 and the first and second 4/3 valves 262 and 264. With the arms 182 and 184 in the desired location, shut off valves 276, 284, and 286 are opened.

FIG. 10 depicts cutting vegetation on a back side of a post, the side that is furthest away from the vehicle moving the mowing machine. It should be appreciated that the mowing machine makes two passes along a guardrail to cut the vegetation along both the front side of each post P (FIG. 3) and the back side of the post (FIG. 10). When cutting on the back side of a post the trimmer head 14 is rotated with respect to the third arm 24. This rotation will be described in more detail below, following a more detailed discussion of the hydraulic control of the arms 182 and 184.

To allow for automatic movement of the arms 182 and 184, referring to FIG. 10, shutoff valves 276, 282, 284, 286 and 288 are closed. Hydraulic cylinders 186 and 188 are used to position the arms 182 and 184 to desired locations by operating the directional flow control valve 254 and the first and second 4/3 valves 262 and 264. Once the arms 182 and 184 are positioned in the desired location, shutoff valves 276, 282 and 288 are opened. The vehicle 18 (FIG. 1) to which the mowing machine 10 (FIG. 1) is attached is moved forward until the second arm 184 contacts the post P. The forward motion of the vehicle 18 results in a force being applied on the second arm 184 which applies a force on the second hydraulic cylinder 188.

With reference back to FIG. 8, the force applied on the second arm 184 results a force in the direction of arrow 300 on the piston in the second hydraulic cylinder 188. With the shutoff valve 276 open, fluid flows through line 272 and shutoff valve 276 into supply line 266 and into the first hydraulic cylinder 186. Displacement of the piston and the first hydraulic cylinder 186 results in fluid flowing through exhaust line 268 and through the open shutoff valve 282 into the accumulator 278. Movement of the piston and the first hydraulic cylinder 186 results in automatic movement of the first arm 182 that is actuated by the first hydraulic cylinder 86.

With reference back to FIG. 10, the force applied by the post P on the second arm 184 results in the first arm 182 rotating towards the post P such that the vegetation around both sides of the post is mowed. As the vehicle 18 continues to move forward the second arm 184 rides along the post P until the second arm no longer contacts the post and the force is removed from the second hydraulic cylinder 188. As the force is removed on the second hydraulic cylinder 188, the accumulator 278 becomes the activating force causing the first cylinder 186 to move back to its preselected position which also causes the second cylinder 188 to move back to its preselected position.

Figure 12C:
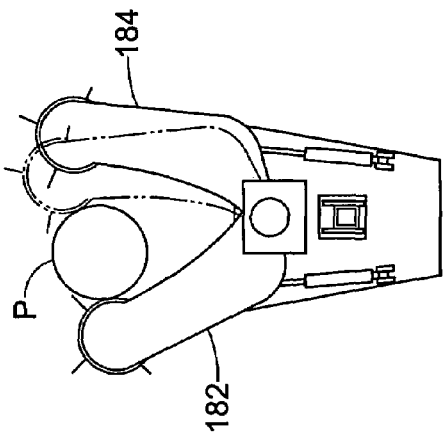
FIG. 12A-12E schematically shows steps of mowing around a vertical support member.
Figure 12B:
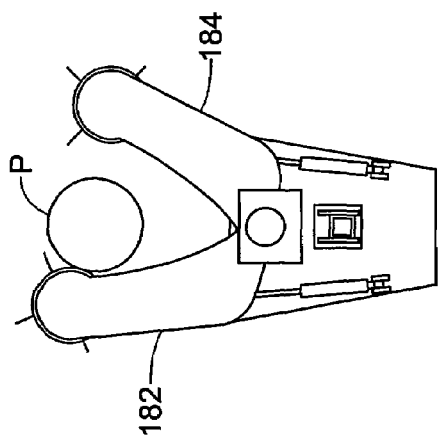
Figure 12A:
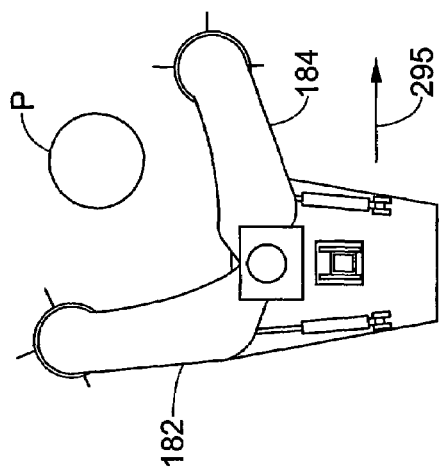

With reference to FIGS. 12A-12D, moving forward, in the direction of arrow 295, the first arm 182 contacts the post P as can be seen when comparing FIG. 12A to FIG. 12B. Contact results in a force being applied to the first arm 182, which applies a force on the first hydraulic cylinder 186 (FIG. 8). Referring back to FIG. 8, the force supplied on the first cylinder 186 is in the direction of the arrow 302. Force applied on the first cylinder 186 moves fluid through the lines 266 and 277 and the open shut off valve 276 into the second cylinder 188. Movement of the piston in the second cylinder 188 results in fluid moving through the exhaust line 274 and the third shut off valve 284 into the accumulator 278.

Figure 12E:
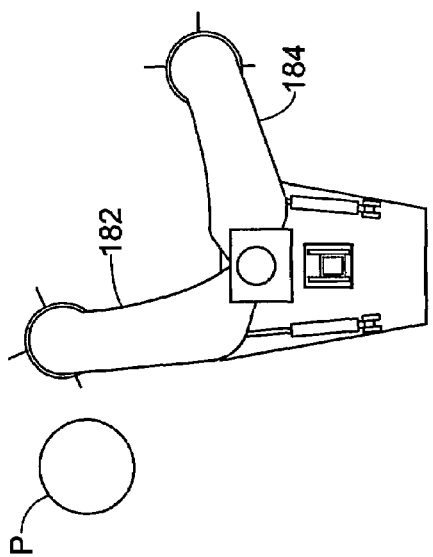
Figure 12D:
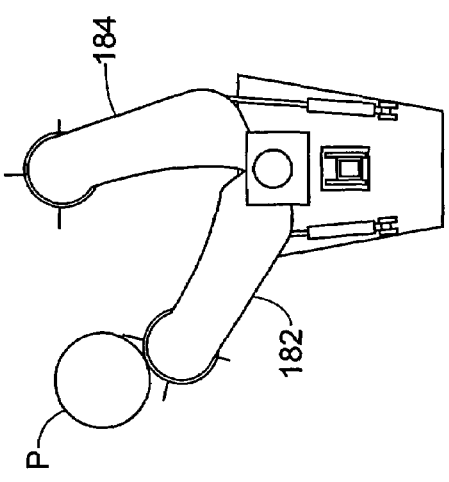

With reference to FIG. 12C, the second arm 184 swings towards the post P in response to movement of the piston in the second hydraulic cylinder 188 (FIG. 8). With reference to FIG. 12D the first arm 182 rides along the post P and the force is maintained on the first cylinder 186. With reference to FIG. 12E, the first arm moves past the post P and the hydraulic fluid stored in the accumulator 278 becomes the driving force. Fluid moves from the accumulator 278 through the open shut off valve 284 into the second cylinder 188. Fluid moves from the second cylinder 188 through the open shut off valve 276 back into the first cylinder 186 thereby repositioning the arms 182 and 184 into their original positions (compare FIG. 12E to FIG. 12A).

Figure 9:
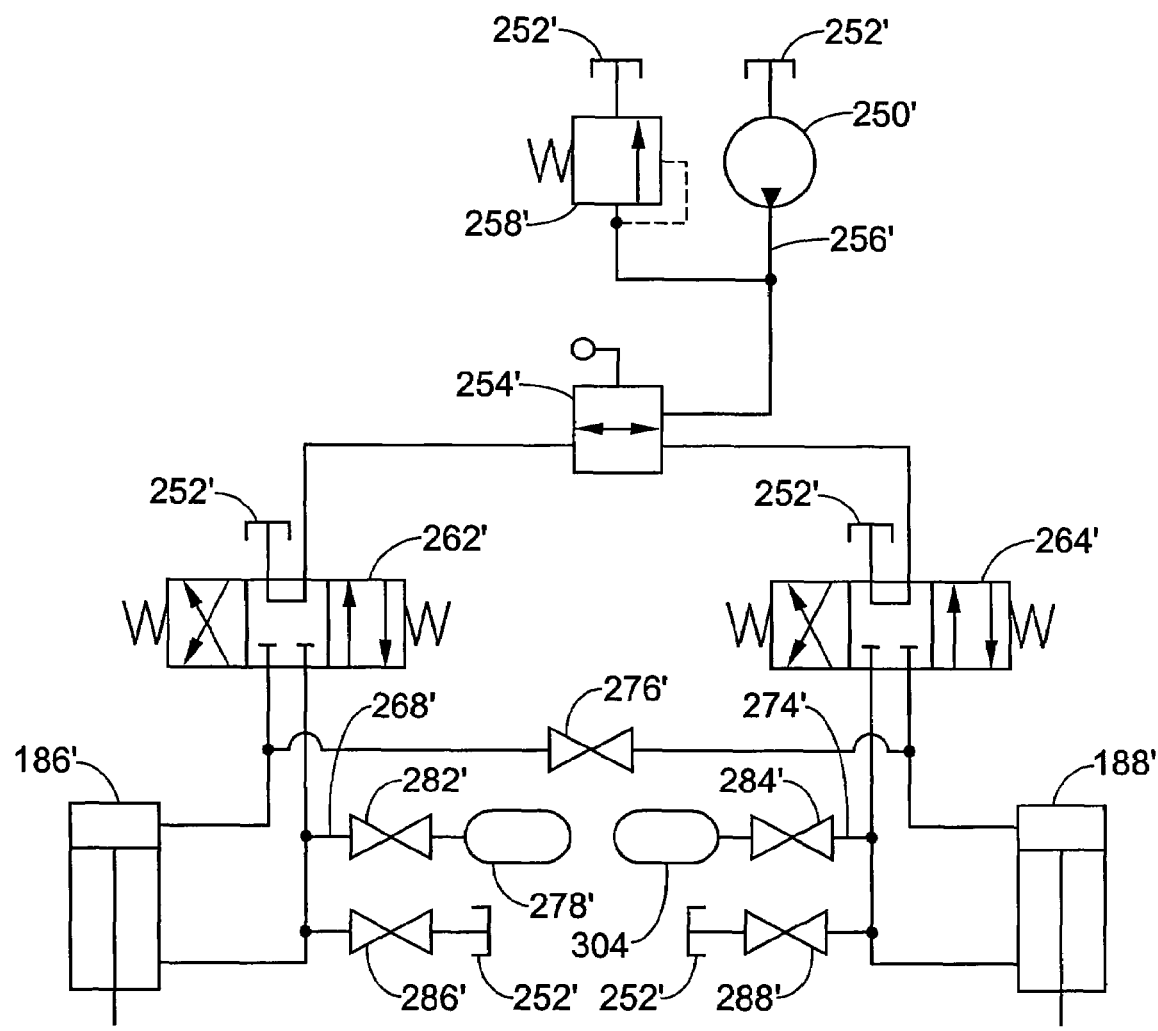
FIG. 9 is an alternative hydraulic control circuit for control of the arms of the trimmer head of the mowing machine of FIG. 1.

Referring to FIG. 9, an alternative hydraulic circuit is shown using two accumulators. This embodiment is similar to FIG. 8; therefore, like numerals with a primed suffix (') represent like elements. New numerals represent new elements. In this embodiment, a pump 250', a directional flow of control valve 254', a first 4/3 valve 262' and a second 4/3 valve 264' communicate with one another in a manner similar to the hydraulic circuit depicted in FIG. 8. Furthermore, a first hydraulic cylinder 186' communicates with the first 4/3 valve 262' in a similar manner to that described with reference to FIG. 8. Similarly, a second hydraulic cylinder 188' communicates with the second 4/3 valve 264' in a similar manner to that described with reference to FIG. 8.

In this embodiment, a first accumulator 278' communicates with an exhaust line 268' of the first hydraulic cylinder 186'. A second accumulator 304 communicates with the second hydraulic cylinder 188' through the shutoff valve 284' via the exhaust line 274'. In this embodiment, instead of having one accumulator, two accumulators are provided; however, the flow of hydraulic fluid through the system is similar to that described with reference to FIG. 8. The functions performed by valves 262', 264', 276' and 258' can also be performed by one double spool valve or by a stacked valve assembly.

Figure 18:
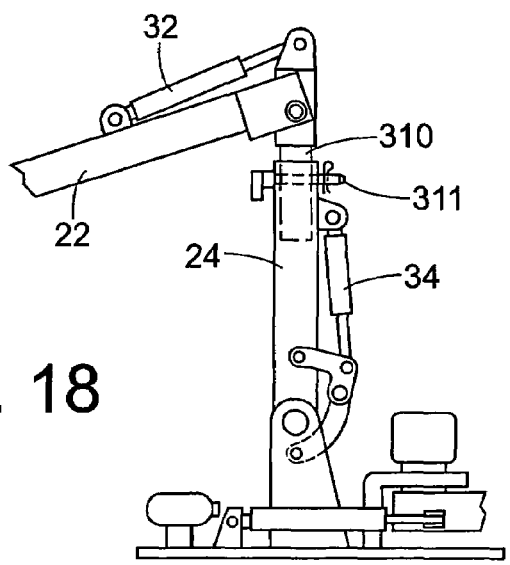
FIG. 18 is a side elevational, partially broken away, view showing an alternative location for a rotary actuator for the mowing machine of FIG. 1.

With reference back to FIG. 10, mowing on the rear side of a guardrail is shown. To mow on the rear side of the guardrail, the side located furthest away from the vehicle or prime mover 18, the support 180 is rotated about the third arm 24 of the boom assembly 12. Referring to FIG. 6, a rotary actuator 310 can be provided on the support 180 and connect to the third arm 24 to allow for 180°, or even a 360°, rotation of the support 180 in relation to the arm 24. One such rotary actuator could include a known L10 Series rotary actuator available from Helac Corporation. The rotary actuator 310 can be controlled by a hydraulic circuit, four examples of which are depicted in FIG. 7A-7D. Alternatively, the rotary actuator 310 can be located nearer the connection between the second arm 22 and the third arm 24, as shown in FIG. 18. Additionally, the rotary actuator can be located elsewhere on the third arm. Also, the rotation of the third arm 24 or the support 180 can be done manually in that a linkage that allows rotation can be provided. In such an embodiment, a pin 311 (FIG. 18) can be provided to lock one member in relation to the other.

Figure 7A:
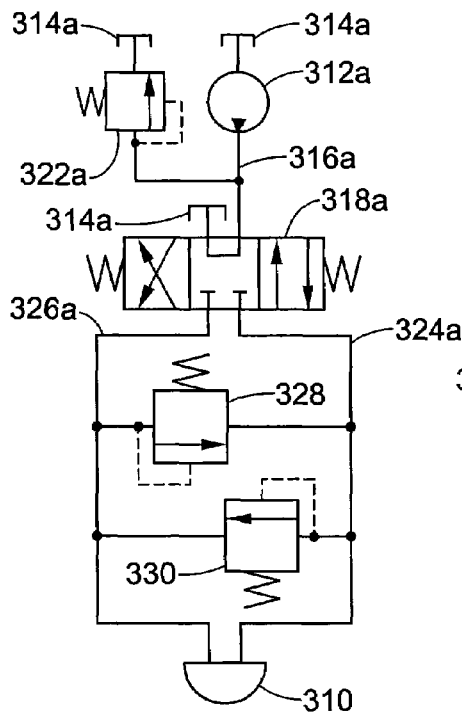
FIGS. 7A-7D are circuit diagrams of four embodiments of hydraulic control circuits for control of a rotating actuator of the trimmer head of the mowing machine of FIG. 1.

Similar to the hydraulic circuits described with reference to FIG. 4A-4O like components of the circuits be referred to with like numerals having a suffix that refers to the Figure number. With reference to FIG. 7A, a pump 312a pumps fluid from a reservoir 314a through a supply line 316a to a 4/3 valve 318a. A relief valve 322a communicates with the line 316a and is interposed between the pump 312a and the 4/3 valve 318a. The relief valve 322a communicates with the reservoir 314a. The 4/3 valve communicates with the reservoir 314a and the rotary actuator 310. The 4/3 valve 318a communicates with the rotary actuator 310 via a first line 324a and a second line 326a. A first relief valve 328 is connected in parallel with the rotary actuator 310 between the first line 324a to the second line 326a. Similarly, a second relief valve 340, oriented in the opposite direction, is connected in parallel with the first relief valve 328 for connecting the first line 324a to the second line 326a. This circuit diagram shows a two-way breakaway.

Figure 7B:
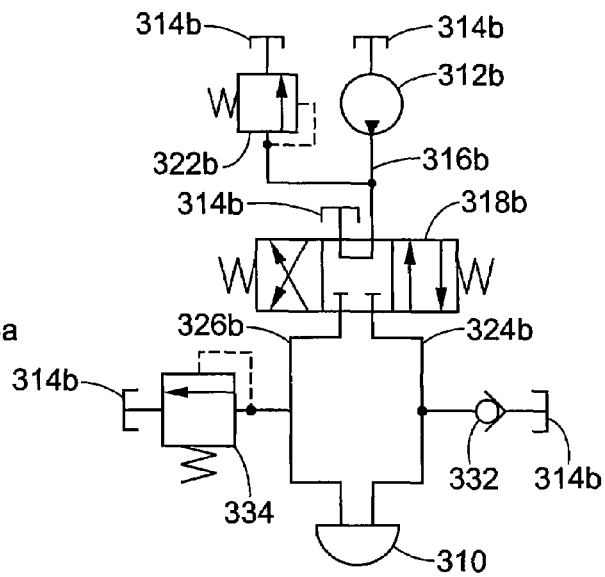

With reference to FIG. 7B, the pump 312b communicates with the 4/3 valve 318b in a similar manner to that of FIG. 7A. The 4/3 valve 318b also communicates with the rotary actuator 310 through a first line 324b and a second line 326b. A check valve 332 is connected to the first line 324b between the 4/3 valve 318b and the rotary actuator 310. A relief valve 334 is connected to the second line 326b between the rotary actuator 310 and the 4/3 valve 318b. The check valve 332 and the relief valve 334 both communicate with the reservoir 314b. This circuit diagram shows a one-way breakaway.

Figure 7C:
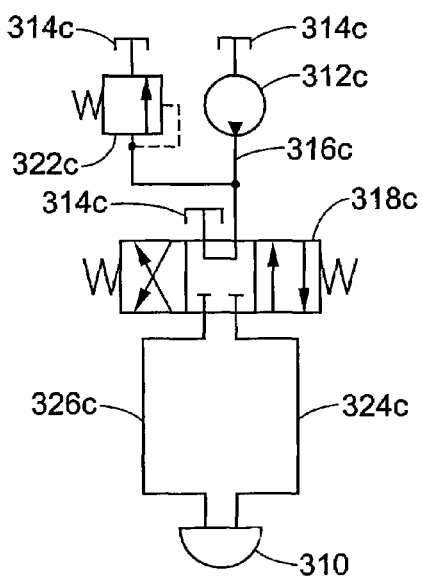

With reference to FIG. 7C, the 4/3 valve 318c receives fluid from the pump 312c in a similar manner to that of FIGS. 7A and 7B. The 4/3 valve 318c communicates directly with the rotary actuator 310 via a first line 324c and a second line 326c. In this circuit, no breakaway is provided.

Figure 7D:
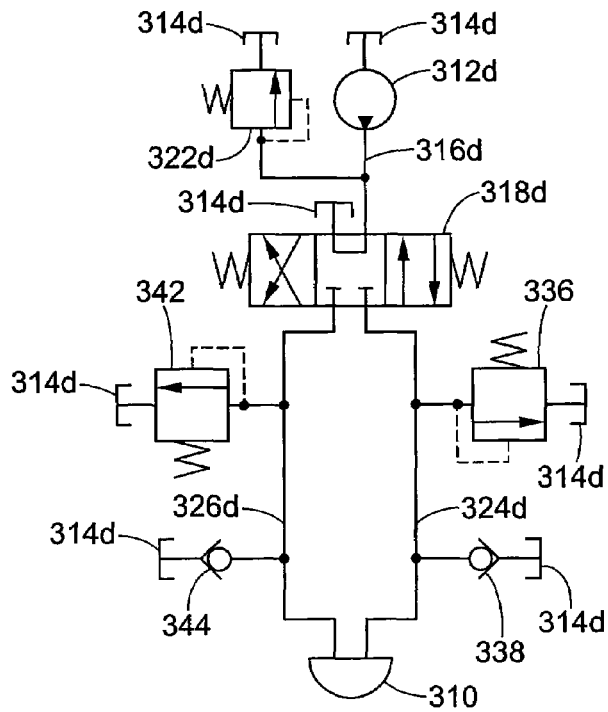

With reference to FIG. 7D, the 4/3 valve 318d communicates with the rotary actuator 310 via a first line 324d and the second line 326d. A first relief valve 336 is located on the first line 324d interposed between the 4/3 valve 318d and the rotary actuator 310. A first check valve 338 is positioned along the first line 324d interposed between the relief valve 336 and the rotary actuator 310. A second relief valve 342 is interposed between the actuator 310 and the 4/3 valve 318d along the second line 326d. A second check valve 344 is positioned between the actuator 310 and the second relief valve 342 on the second line 326d. As with FIG. 7A, this hydraulic circuit diagram shows a two-way breakaway.

While the discussion above has mentioned hydraulic circuits and hydraulic actuation of the swinging and breakaway functions of the device, it should be appreciated that the movement and the swinging and rotation functions of the boom assembly 12, the trimmer head or cutter head 14 and its arms 182 and 184 could be powered by air or pneumatic cylinders as well. Alternatively, one or more of these functions could be performed by springs.

Figure 11:
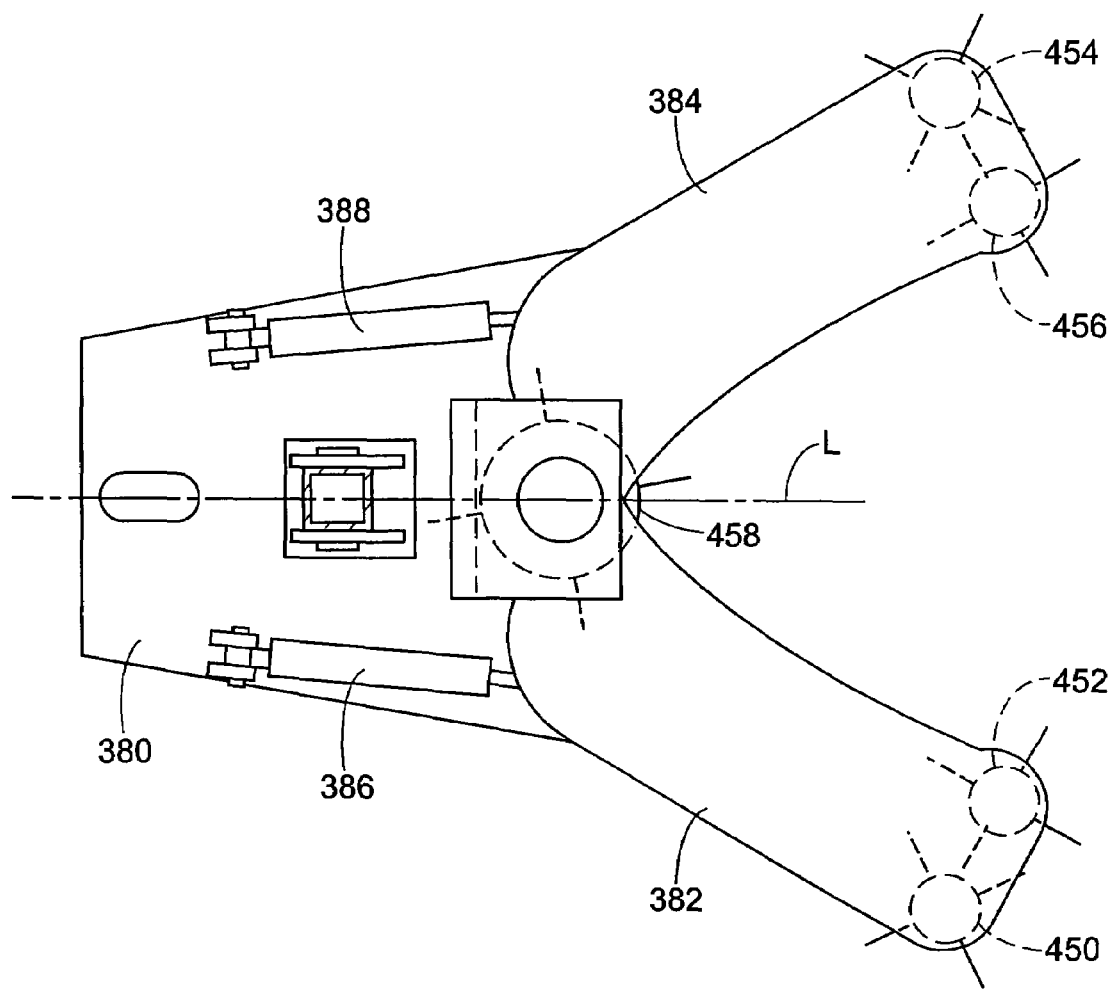
FIG. 11 is another embodiment of a trimmer head according to the present invention showing a plurality of mowing elements.

With reference to FIG. 11, a trimmer head according to the present invention can also be provided with a plurality of mower elements. Thus, a first arm 382 can include a first mower element 450 and a second mower element 452 mounted adjacent a distal end of the first arm 382. For that matter, if desired, a plurality of mower elements (not illustrated) could be provided along the length of the first arm 382. The second arm 384 also includes first and second mower elements 454 and 456 respectively mounted adjacent a distal end of the second mower arm 484. A support plate 380 can include a transverse axis that is perpendicular to a longitudinal axis L through which a yet further mower element 458 can be aligned. The additional mower element is mounted directly to the mounting plate 380, instead of being mounted to one or the arms 382, 384. Such an additional mowing element may prove useful if there is vegetation to cut between the guardrail and the road on which the vehicle or prime mover travels. In other words, the mower elements 450-456 are adapted to cut around posts and may leave untrimmed vegetation lying between the posts and the road. FIG. 11 is just another example of the many possible trimmer head configurations available according to the present invention.

Figure 13:
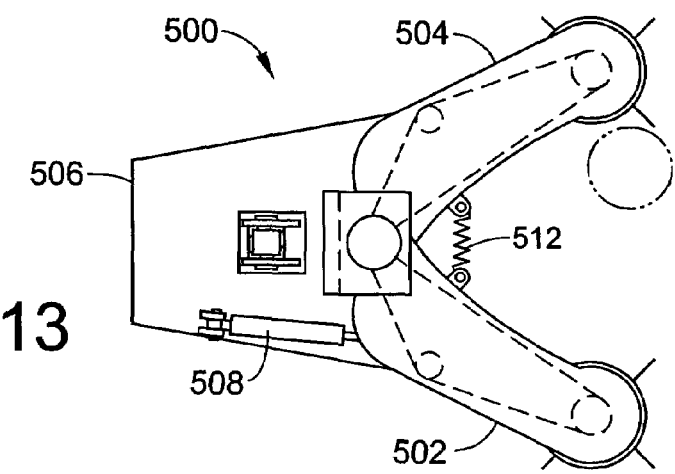
FIG. 13 is another embodiment of a trimmer head according to the present invention showing spring loaded support arms.

With reference to FIG. 13, a trimmer head 500 according to another embodiment of the present invention can be provided with spring actuated support arms. In this embodiment, a first arm 502 and a second arm 504 are pivotally mounted to a support plate 506, similar to the trimmer heads disclosed in FIG. 2 and FIG. 11. A hydraulic cylinder 508 attaches to the support plate 506 and the first arm 502. Actuation of the cylinder 508 controls movement of the first arm 502. A biasing member 512 connects the first arm 502 to the second arm 504. The biasing member 512 can include a conventional spring, a rod or a hydraulic cylinder, or another conventional biasing member. Movement of the second arm 504 is also controlled by the hydraulic cylinder 508 since the first arm 502 is connected to the second arm 504 by the biasing member 512. It is contemplated that the biasing member 512 can include an internal or external stop (not shown) to compensate for different post diameters.

Figure 14:
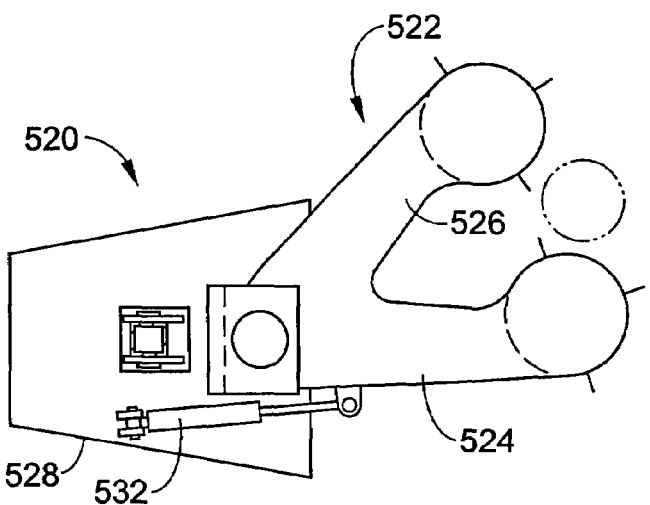
FIG. 14 is another embodiment of a trimmer head according to the present invention showing a one-piece rotating cutter head frame.

With reference to FIG. 14, a trimmer head 520 having a one-piece rotating cutter head frame 522 can also be provided according to yet another embodiment of the present invention. In this embodiment, the rotating cutter head frame 522 includes a first arm 524 and a second arm 526 similar to the arms for the trimmer heads described above. However, the arms 522 and 526 are both connected to a single stem 528 such that they rotate as a single piece. The cutter head frame 522 rotatably mounts to a support 530. A hydraulic cylinder 532 attaches to the support 530 and the stem 528 of the cutter head frame 522 to control movement of the cutter head frame.

Figure 15:
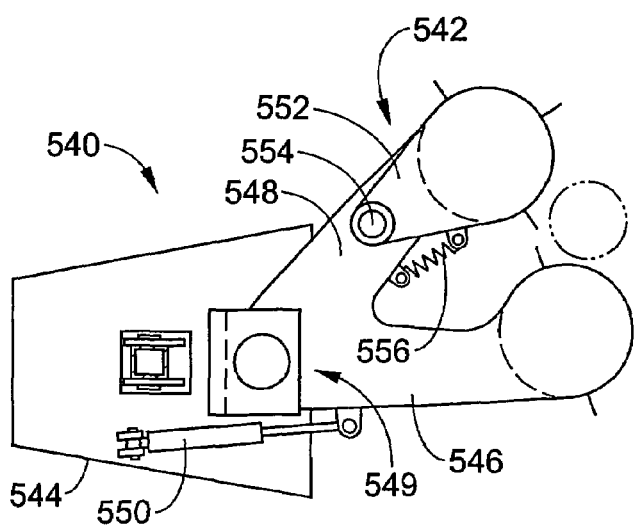
FIG. 15 is another embodiment of a trimmer head according to the present invention showing a rotating cutter head frame having an adjustable mower head mount.

With reference to FIG. 15, a trimmer head 540 including an adjustable cutter head frame 542 is disclosed. In this embodiment, the cutter head frame 542 rotatably mounts to a support 544 similar to the trimmer head 520 disclosed in FIG. 14. The cutter head frame 542 includes a first arm 546 and a second arm 548 that are attached to a common stem 549 such that they rotate about the support 544 as one piece. Movement of the cutter head frame 542 is controlled by actuating a hydraulic cylinder 550 connected to the support 544 and the first arm 546. Pivotally mounted to the second arm 548 of the cutter head frame 542 is a cutter head 552. The cutter head 552 attaches to the second arm 548 via a pin 554 to allow the cutter head 552 to rotate with respect to the second arm 548. Rotation of the cutter head in relation to the second arm 548 is controlled via a spring or other biasing member 556. The spring 556 can be provided with a travel stop (not shown) to limit the movement thereof. Pivoting of the cutter head 552 allows for adjustment of the assembly to compensate for posts having different diameters.

Figure 16:
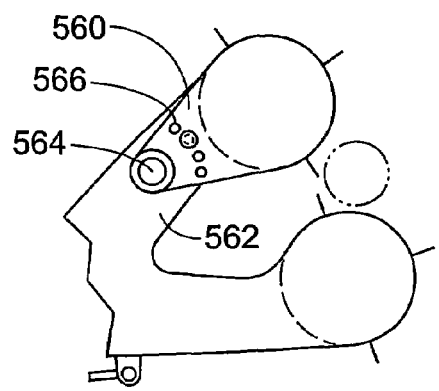
FIG. 16 is an alternative embodiment of a mower head mount attached to a cutter head frame.

An alternative embodiment of a cutter head mount and arm is disclosed in FIG. 16. In this embodiment, a cutter head 560 is attached to a second arm 562 via a pin 564. One or more bolts or pins 566 can be received in openings (not shown) in the second arm 562 so that the cutter head mount 560 can move in relation to the second arm 562 and lock into place.

All of the alternative trimmer head embodiments described in FIGS. 13-16 can attach to the boom assembly 12 of FIG. 1 in a similar manner to the trimmer head depicted in FIG. 1. Also, the trimmer head embodiments described in FIGS. 13-16 can include one or more mowing elements on the distal end of each arm, similar to the embodiments depicted hereinabove.

Figure 17:
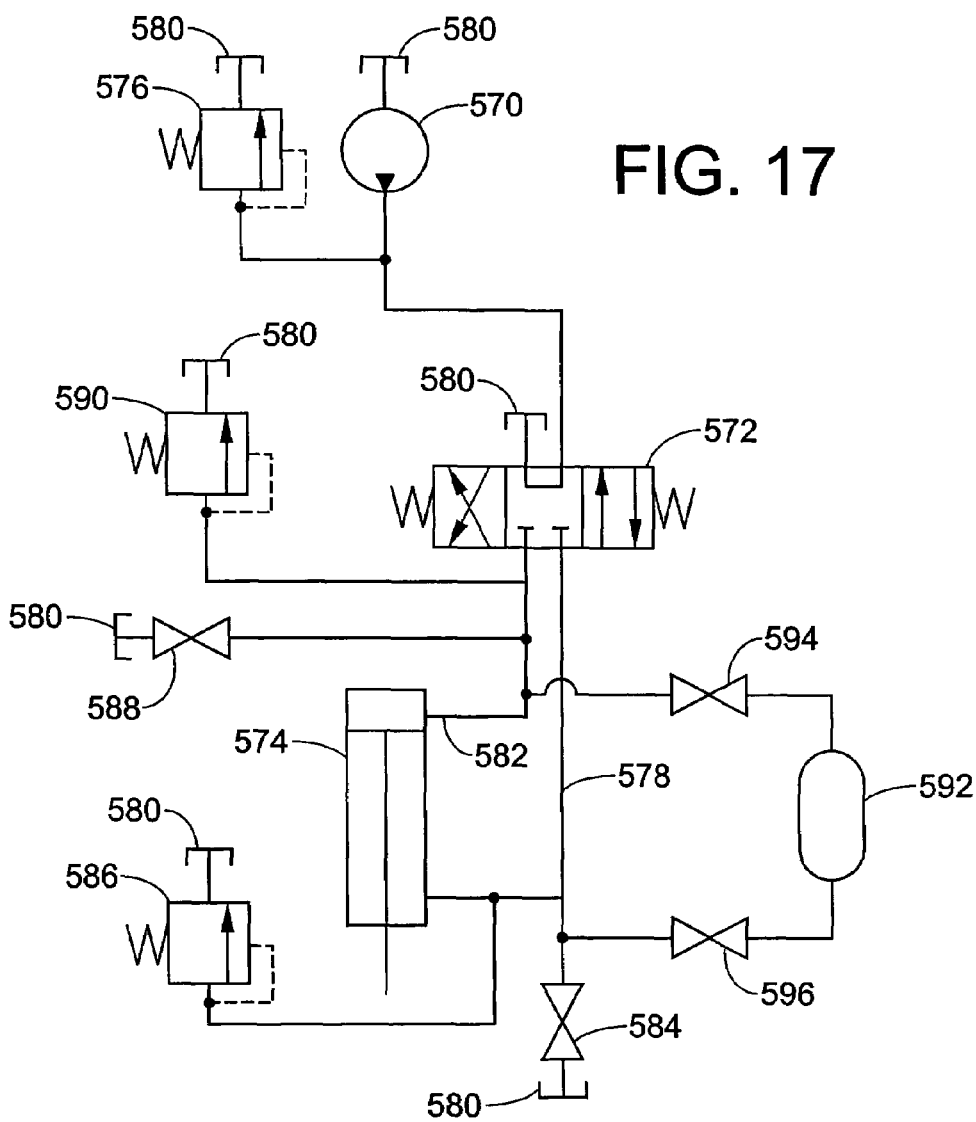
FIG. 17 is a circuit diagram of a hydraulic control circuit for controlling movement of the cutter heads for the embodiments disclosed in FIGS. 13-16.

FIG. 17 discloses a hydraulic circuit for the operation of a trimmer head having a single rotating frame controlled by one hydraulic cylinder, such as the embodiments disclosed in FIGS. 13-16. A pump 570 communicates with a 4/3 valve 572. A relief valve 576 is interposed between the pump 570 and the 4/3 valve 572. The 4/3 valve 572 communicates with a double-acting differential cylinder 574 (which is depicted as 508 in FIG. 13, 532 in FIG. 14, and 550 in FIG. 15) via a supply line 578 and an exhaust line 582. The pump 570, the 4/3 valve 572 and the relief valve 576 communicate with a reservoir 580. A shut-off valve 584, which communicates with the reservoir 580, is interposed between the 4/3 valve 572 and the cylinder 574 on the supply line 578. A relief valve 586, which also communicates with the reservoir 580, is interposed between the shut-off valve 584 and the cylinder 574 on the supply line 578. A shut-off valve 588, which also communicates with the reservoir 580, is interposed between the cylinder 574 and the 4/3 valve 572 on the exhaust line 582. A relief valve 590, which communicates with the reservoir 580, is interposed between the shut-off valve 588 and the 4/3 valve 572. An accumulator 592 is connected to the supply line 578 and the exhaust line 582. A first shut-off valve 594 is positioned between the exhaust line 582 and the accumulator 592. A second shut-off valve 596 is positioned between the supply line 578 and the accumulator 592.

When cutting on the road side of the guardrail, similar to the configuration disclosed in FIG. 3, valves 594, 596, 584, and 588 are closed. The cylinder 574 [508, 532, 550] positions the arms or cutter head frame (which are shown in FIGS. 13-15). Valves 594 and 584 are then opened. A force applied on the cutter head frame results in movement of the piston in the cylinder 508, 532, 550 moving hydraulic fluid from the cylinder through the shut-off valve 594 into the accumulator 592. When the force is removed, the accumulator 592 becomes the actuating force moving fluid from the accumulator through the shut-off valve 594 and back into the cylinder. When cutting the back side of the guardrail, similar to the configurations disclosed in FIG. 10, valves 596 and 588 would be opened after the cylinder 574 has positioned the arms in the appropriate location.

The circuitry disclosed in the circuit diagram of FIG. 17 can be used to control the positions of the arms or cutter head frame on both the roadside of the guard rail and the opposite side of the guard rail. In some instances it may be desirable to provide circuitry useful only in mowing on one side of the guard rail. With references to FIG. 17A, where like numerals that include a suffix "a" will refer to like components from FIG. 17, a pump 570a communicates with a 4/3 valve 572a. A relief valve 576a is interposed between the pump 570a and the 4/3 valve 572a. The 4/3 valve 572a communicates with a double-acting differential cylinder 574a, which could also be a through rod-type cylinder, via a supply line 578a and an exhaust line 582a. The pump 570a, the 4/3 valve 572a and the relief valve 576a communicate with a reservoir 580a. A shutoff valve 584a, which communicates with the reservoir 580a, is disposed in the supply line 578a. A relief valve 590a, which communicates with the reservoir 580a, is disposed on the exhaust line 582a and is interposed between the cylinder 574a and the 4/3 valve 572a. An accumulator 592a is connected to the exhaust line 582a. A first shutoff valve 594a is positioned between the cylinder 574a and the accumulator 592a on the exhaust line 582a. Shutoff valves 584a and 594a are closed when positioning the rotating frame. When the rotating frame is in the cutting position, valves 584a and 594a are opened. A force on the frame (522 in FIG. 14, 542 in FIG. 15) results in hydraulic fluid moving from the cylinder 574a into the accumulator 592a. Once the force has been removed from the frame, the accumulator 574a becomes the actuating force moving fluid back into the cylinder.

Figure 17A:
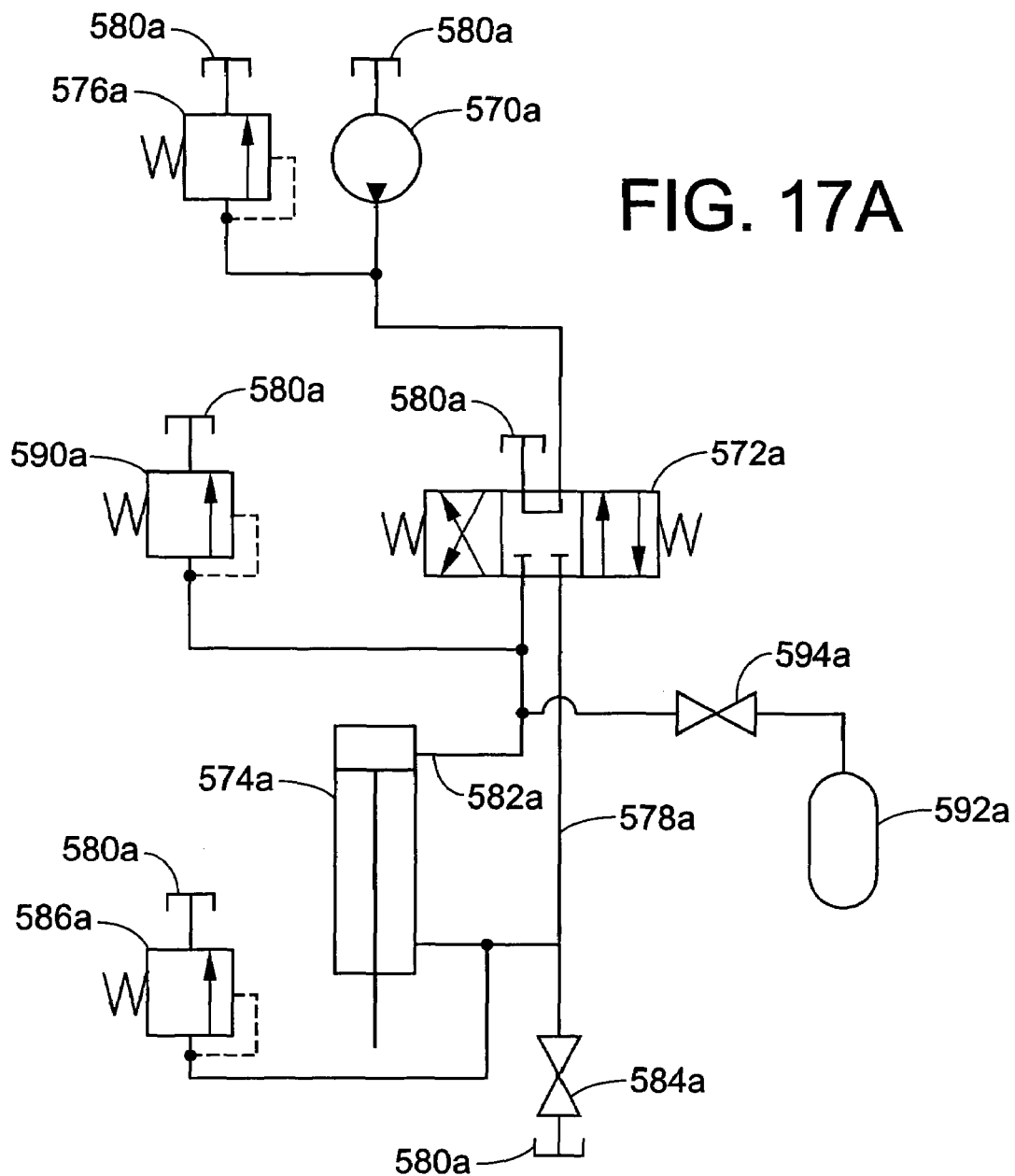
FIG. 17A is a circuit diagram of a hydraulic control circuit for controlling movement of the cutter heads for the embodiments disclosed in FIGS. 13-16, where automatic movement of the support arms of the trimmer head is only in one mowing direction.

The functions performed by the valves disclosed in FIGS. 17 and 17A can be combined into one or more valve packages. Furthermore, in lieu of the accumulator 592 in FIG. 17, the hydraulic cylinder could also be operated with a lever controlled hydraulic valve or an electric actuated control valve. This holds true for the other hydraulic circuits disclosed above.

Thus, the instant specification has disclosed several embodiments of a machine with two or more cutter heads, each of which may be equipped with one or more cutting blades or cutting filaments. The machine may be attached to a wheel-type tractor, or similar carrier that is equipped with a main support arm. The main support arm, which can include one or more sections, is controlled by an operator of the tractor and may be equipped with a breakaway circuit to prevent damage to the arm.

Each cutter head is attached to a rotatable arm that will swing forward and rearward. As the tractor or carrier moves forward and the rear arm comes in contact with a post, around which trimming is desired, the front arm will automatically swing into the proper cutting position. Then the cutter heads on the front and rear arms will, together, cut in excess of 180° around the post or support. Thereafter, both arms will return to their starting positions so that they are ready to trim around the next post.

The exemplary embodiments of the invention have been described above. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A control system for a trimmer head assembly for a mowing machine, the system comprising:

a first arm including a first mowing device;
a first cylinder connected to said first arm, the first cylinder being in communication with a source of fluid for delivering fluid toward the first cylinder to control the position of the first arm;
an accumulator in selective communication with the first cylinder when the first cylinder is not in communication with the source of fluid, the accumulator adapted to receive fluid from the first cylinder when an external force is applied the first arm and to deliver fluid to the first cylinder when the external force has been removed from the first arm; and
a second arm including a second mowing device; and,
a second cylinder connected to said second arm, the second cylinder being in communication with a source of fluid for delivering fluid toward the second cylinder to control the position of the second arm, wherein the second cylinder is in selective communication with the first cylinder in a manner to allow fluid from the first cylinder to flow toward the second cylinder to provide fluid to the second cylinder when the external force is applied to the first cylinder.

2. The system of claim 1, further comprising a shut-off valve interposed between the first cylinder and the accumulator.

3. The system of claim 1, wherein the accumulator is in communication with both a first side of the first cylinder and a second side of the first cylinder, the accumulator being adapted to receive fluid from the first cylinder in response to an external force that is applied to the first arm in a first direction and also in response to an external force that is applied to the first arm in a second direction that is opposite the first.

4. The system of claim 3, further comprising a first shut-off valve interposed between the first side of the first cylinder and the accumulator and a second shut-off valve interposed between the second side of the first cylinder and the accumulator.

5. The system of claim 1, further comprising a shut-off valve interposed between the first cylinder and the second cylinder.

6. The system of claim 1, wherein the second cylinder is in communication with the accumulator.

7. The system of claim 6, further comprising a shut-off valve interposed between the second cylinder and the accumulator.

8. A control system for a trimmer assembly mounted on an associated mowing machine, the system comprising:

a first arm including a first mowing device;
a first cylinder connected to said first arm, the first cylinder being in communication with an associated source of fluid for delivering fluid toward the first cylinder to control the position of the first arm;
a second arm including a second mowing device;
a second cylinder connected to said second arm, the second cylinder being in communication with an associated source of fluid for delivering fluid toward the second cylinder to control the position of the second arm, wherein the second cylinder is in communication with the first cylinder in a manner to allow fluid from the first cylinder to flow toward the second cylinder to provide fluid to the second cylinder in response to an external force being applied to the first arm;
a first control valve including an associated first actuator for operating said first control valve between an operating position and a neutral position, the first control valve allowing fluid to flow between the associated source of fluid and the first cylinder when the first control valve is in the operating position; and a second control valve including an associated second actuator for operating said second control valve between an operating position and a neutral position, the second control valve allowing fluid to flow between the associated source of fluid and the second cylinder when the second control valve is in the operating position.

9. The system of claim 8 further comprising a first accumulator in selective communication with at least one of said first and second cylinders.

10. The system of claim 9, further comprising a second accumulator, wherein the first accumulator is in selective communication with the first cylinder and the second accumulator is in selective communication with the second cylinder.

11. The system of claim 10, further comprising a shut-off valve interposed between the second cylinder and the second accumulator.

12. A system for controlling a pair of arms of a trimmer head of a mowing apparatus, the system comprising:
a first arm including a first cutter;
a first cylinder connected to said first arm;
a second arm including a second cutter;
a second cylinder connected to said second arm, wherein the first cylinder is in selective fluid communication with the second cylinder, such that, in response to an external force being applied to the first arm, fluid moves from the first cylinder toward the second cylinder to move the second arm toward the first arm; and,
an accumulator in selective fluid communication with at least one of the first and second cylinders, wherein the accumulator is adapted to receive fluid from the at least one of the first and second cylinders when an external force is applied to the arm connected to the at least one of the first and second cylinders.

13. The system of claim 12, further comprising a shut-off valve interposed between the first cylinder and the second cylinder.

14. The system of claim 12, wherein in response to the external force being removed from the first arm, fluid moves from the second cylinder toward the first cylinder to move the first arm away from the second arm.

15. A method for mowing around an obstacle such as guardrail post, the method comprising:
positioning a trimmer head in a mowing position in relation to an obstacle, the trimmer head comprising a first arm having a cutter mounted thereto, a second arm having a cutter mounted thereto, a first cylinder connected to the first arm and second cylinder connected to the second arm;
providing fluid communication between the first cylinder and the second cylinder;
moving the trimmer head in a first direction toward the obstacle;
contacting the obstacle with the first arm;
automatically moving the first arm from a first arm position in response to a force exerted on the first arm by the obstacle; and,
automatically moving the second arm in response to the force exerted on the first arm by the obstacle.

16. The method of claim 15, further comprising:
moving the trimmer head in the first direction until the first arm no longer contacts the obstacle; and,
moving the first arm towards the first arm position in response to the force no longer being applied to the first arm.

17. The method of claim 16, further comprising moving the second arm in response to the force no longer being applied to the first arm.

18. The method of claim 15, further comprising directing fluid into an accumulator in response to the force being applied to the first arm.

* * * * *